(12) United States Patent
Dahn et al.

(10) Patent No.: US 7,368,071 B2
(45) Date of Patent: May 6, 2008

(54) CATHODE COMPOSITIONS FOR LITHIUM ION BATTERIES

(75) Inventors: Jeffrey R. Dahn, Hubley (CA); Zhonghua Lu, Halifax (CA)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 11/317,607

(22) Filed: Dec. 23, 2005

(65) Prior Publication Data

US 2006/0159994 A1 Jul. 20, 2006

Related U.S. Application Data

(63) Continuation of application No. 10/210,919, filed on Aug. 2, 2002, now abandoned.

(60) Provisional application No. 60/310,622, filed on Aug. 7, 2001.

(51) Int. Cl.
*H01B 1/08* (2006.01)
*H01M 4/48* (2006.01)

(52) U.S. Cl. ............... 252/519.1; 252/521.3; 429/218.1; 429/224; 429/231.95

(58) Field of Classification Search ............ 252/519.1, 252/521.3; 429/231.95, 218.1, 224
See application file for complete search history.

(56) References Cited

U.S. PATENT DOCUMENTS

| | | |
|---|---|---|
| 4,567,031 A | 1/1986 | Riley |
| 4,780,381 A | 10/1988 | Shacklette et al. |
| 5,264,201 A | 11/1993 | Dahn et al. |
| 5,292,601 A | 3/1994 | Sugeno et al. |
| 5,370,948 A | 12/1994 | Hasegawa et al. |
| 5,393,622 A | 2/1995 | Nitta et al. |
| 5,474,858 A | 12/1995 | Merritt |
| 5,478,671 A | 12/1995 | Idota |
| 5,478,675 A | 12/1995 | Nagaura |
| 5,521,027 A | 5/1996 | Okuno et al. |
| 5,525,443 A | 6/1996 | Okuno et al. |

(Continued)

FOREIGN PATENT DOCUMENTS

EP 0 501 187 B1 4/1996

(Continued)

OTHER PUBLICATIONS

Lu et al "Understanding the Anomalous Capacity of Li/Li[NixLi(1/3-2x/3)Mn(2/3-x/3)])2 Cells Using In Situ X-Ray Diffractio and Electrochemical Studies", Journal of the Electrochemcial Society, 149(7), A815-22 (2002).*

(Continued)

*Primary Examiner*—Mark Kopec
(74) *Attorney, Agent, or Firm*—Lucy C. Weiss; Dean M. Harts

(57) ABSTRACT

A cathode composition for a lithium ion battery that contains lithium having the formula (a) $Li_y[M^1_{(1-b)}Mn_b]O_2$ or (b) $Li_y[M^1_{(1-b)}Mn_b]O_{1.5+c}$ where $0 \leq y < 1$, $0 < b < 1$ and $0 < c < 0.5$ and $M^1$ represents one or more metal elements, with the proviso that for (a) $M^1$ is a metal element other than chromium. The composition is in a form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

23 Claims, 16 Drawing Sheets

U.S. PATENT DOCUMENTS

| | | | |
|---|---|---|---|
| 5,531,920 A | 7/1996 | Mao et al. |
| 5,538,814 A | 7/1996 | Kamauchi et al. |
| 5,565,688 A | 10/1996 | Hayashi |
| 5,589,300 A | 12/1996 | Fauteux et al. |
| 5,609,975 A | 3/1997 | Hasegawa et al. |
| 5,626,635 A | 5/1997 | Yamaura et al. |
| 5,718,989 A | 2/1998 | Aoki et al. |
| 5,742,070 A | 4/1998 | Hayashi et al. |
| 5,753,202 A | 5/1998 | Wang et al. |
| 5,770,173 A | 6/1998 | Nitta et al. |
| 5,783,332 A | 7/1998 | Amine et al. |
| 5,783,333 A | 7/1998 | Mayer |
| 5,795,558 A | 8/1998 | Aoki et al. |
| 5,858,324 A | 1/1999 | Dahn et al. |
| 5,869,208 A | 2/1999 | Miyasaka |
| 5,879,654 A | 3/1999 | van Ghemen et al. |
| 5,900,385 A | 5/1999 | Dahn et al. |
| 5,911,920 A | 6/1999 | Hasezaki et al. |
| 5,948,569 A | 9/1999 | Moses et al. |
| 5,981,106 A | 11/1999 | Amine et al. |
| 5,981,445 A | 11/1999 | Kirchnerova et al. |
| 5,992,773 A | 11/1999 | Schwechten |
| 5,993,998 A | 11/1999 | Yasuda |
| 6,007,947 A | 12/1999 | Mayer |
| 6,017,654 A | 1/2000 | Kumta et al. |
| 6,030,726 A | 2/2000 | Takeuchi et al. |
| 6,040,089 A | 3/2000 | Manev et al. |
| 6,040,090 A | 3/2000 | Sunagawa et al. |
| 6,045,771 A | 4/2000 | Matsubara et al. |
| 6,077,496 A | 6/2000 | Ito et al. |
| 6,103,422 A | 8/2000 | Kanai |
| 6,168,887 B1 | 1/2001 | Dahn et al. |
| 6,203,944 B1 | 3/2001 | Turner et al. |
| 6,203,947 B1 | 3/2001 | Peled et al. |
| 6,214,493 B1 | 4/2001 | Bruce et al. |
| 6,225,017 B1 | 5/2001 | Sato et al. |
| 6,248,477 B1 | 6/2001 | Howard, Jr. et al. |
| 6,255,017 B1 | 7/2001 | Turner |
| 6,270,925 B1 | 8/2001 | Takada et al. |
| 6,274,273 B1 | 8/2001 | Cho et al. |
| 6,277,521 B1 | 8/2001 | Gao et al. |
| 6,284,827 B1 | 9/2001 | Eckhardt et al. |
| 6,291,103 B1 | 9/2001 | Park et al. |
| 6,333,128 B1 | 12/2001 | Sunagawa et al. |
| 6,350,543 B2 | 2/2002 | Yang et al. |
| 6,361,756 B1 | 3/2002 | Gao et al. |
| 6,365,299 B1 | 4/2002 | Miyaki et al. |
| 6,368,749 B1 | 4/2002 | Yanai et al. |
| 6,372,385 B1 | 4/2002 | Kweon et al. |
| 6,395,250 B2 | 5/2002 | Matsubara et al. |
| 6,436,574 B1 | 8/2002 | Numata et al. |
| 6,521,379 B2 | 2/2003 | Nishida et al. |
| 6,551,744 B1 | 4/2003 | Ohzuku et al. |
| 6,579,475 B2 | 6/2003 | Gao et al. |
| 6,582,852 B1 | 6/2003 | Gao et al. |
| 6,589,499 B2 | 7/2003 | Gao et al. |
| 6,589,694 B1 | 7/2003 | Gosho et al. |
| 6,620,400 B2 | 9/2003 | Gao et al. |
| 6,623,886 B2 | 9/2003 | Yang et al. |
| 6,660,432 B2 * | 12/2003 | Paulsen et al. ......... 429/231.3 |
| 6,677,082 B2 | 1/2004 | Thackeray et al. |
| 6,680,143 B2 | 1/2004 | Thackeray et al. |
| 6,808,848 B2 | 10/2004 | Nakanishi et al. |
| 6,881,393 B2 | 4/2005 | Spitler et al. |
| 6,884,543 B2 | 4/2005 | Tsujimoto et al. |
| 6,893,776 B2 | 5/2005 | Naruoka et al. |
| 6,964,828 B2 * | 11/2005 | Lu et al. ............... 429/231.95 |
| 7,078,128 B2 * | 7/2006 | Lu et al. ............... 429/231.95 |
| 2001/0010807 A1 | 8/2001 | Matsubara |
| 2001/0016285 A1 | 8/2001 | Cho et al. |
| 2001/0024754 A1 * | 9/2001 | Fukuzawa et al. ......... 429/224 |
| 2001/0031397 A1 | 10/2001 | Kweon et al. |
| 2002/0006550 A1 | 1/2002 | Yang et al. |
| 2002/0012843 A1 | 1/2002 | Munakata et al. |
| 2002/0015887 A1 | 2/2002 | Gao et al. |
| 2002/0018746 A1 | 2/2002 | Gao et al. |
| 2002/0053663 A1 | 5/2002 | Ito et al. |
| 2002/0071990 A1 | 6/2002 | Kweon et al. |
| 2002/0071991 A1 | 6/2002 | Kweon et al. |
| 2002/0086210 A1 | 7/2002 | Naruoka et al. |
| 2002/0119373 A1 | 8/2002 | Gao et al. |
| 2002/0127175 A1 | 9/2002 | Gao et al. |
| 2002/0150530 A1 | 10/2002 | Gao et al. |
| 2003/0022063 A1 | 1/2003 | Paulsen et al. |
| 2003/0031931 A1 | 2/2003 | Obrovac et al. |
| 2003/0035999 A1 | 2/2003 | Gao et al. |
| 2003/0082452 A1 | 5/2003 | Ueda et al. |
| 2003/0108793 A1 | 6/2003 | Dahn et al. |
| 2004/0197658 A1 | 10/2004 | Kase et al. |
| 2005/0130042 A1 | 6/2005 | Liu et al. |
| 2005/0142442 A1 | 6/2005 | Yuasa et al. |
| 2005/0260496 A1 | 11/2005 | Ueda et al. |
| 2006/0159994 A1 | 7/2006 | Dahn et al. |

FOREIGN PATENT DOCUMENTS

| | | |
|---|---|---|
| EP | 0 468 942 B1 | 1/1997 |
| EP | 0 672 622 B1 | 10/1998 |
| EP | 0 468 942 B2 | 1/1999 |
| EP | 0 903 796 A1 | 3/1999 |
| EP | 0 918 041 A1 | 5/1999 |
| EP | 0 944 125 A1 | 9/1999 |
| EP | 1 117 145 A1 | 7/2001 |
| EP | 1 189 296 A2 | 3/2002 |
| EP | 0 813 256 B1 | 5/2002 |
| EP | 0 782 206 B1 | 4/2003 |
| JP | 55-046288 | 3/1980 |
| JP | 5-67466 | 3/1993 |
| JP | 5-182667 | 7/1993 |
| JP | 5-198301 | 8/1993 |
| JP | 5-283077 | 10/1993 |
| JP | 6-60867 | 3/1994 |
| JP | 6-275264 | 9/1994 |
| JP | 6-275269 | 9/1994 |
| JP | 6-342657 | 12/1994 |
| JP | 7-134985 | 5/1995 |
| JP | 7-235291 | 9/1995 |
| JP | 7-235292 | 9/1995 |
| JP | 8-31408 | 2/1996 |
| JP | 8-37007 | 2/1996 |
| JP | 8-171910 | 7/1996 |
| JP | 8-171935 | 7/1996 |
| JP | 8-213015 | 8/1996 |
| JP | 8-222220 | 8/1996 |
| JP | 2561556 | 9/1996 |
| JP | 8-273665 | 10/1996 |
| JP | 8-315819 | 11/1996 |
| JP | 2668678 | 7/1997 |
| JP | 9-237631 | 9/1997 |
| JP | 2699176 | 9/1997 |
| JP | 10-106562 | 4/1998 |
| JP | 10-106565 | 4/1998 |
| JP | 10-172571 | 6/1998 |
| JP | 10-188982 | 7/1998 |
| JP | 2822659 | 9/1998 |
| JP | 11-25957 | 1/1999 |
| JP | 11-086861 | 3/1999 |
| JP | 11-195416 | 7/1999 |
| JP | 11-213999 | 8/1999 |
| JP | 11-273677 | 10/1999 |
| JP | 11-354156 | 12/1999 |
| JP | 2000-503453 | 3/2000 |
| JP | 3042128 | 3/2000 |
| JP | 2000-173599 | 6/2000 |

| | | |
|---|---|---|
| JP | 2000-173667 | 6/2000 |
| JP | 3079382 | 6/2000 |
| JP | 3079613 | 6/2000 |
| JP | 2000-186861 | 7/2000 |
| JP | 2000-195514 | 7/2000 |
| JP | 3089662 | 7/2000 |
| JP | 2000-223122 | 8/2000 |
| JP | 2000-223157 | 8/2000 |
| JP | 2000-231919 | 8/2000 |
| JP | 2000-268821 | 9/2000 |
| JP | 2000-268864 | 9/2000 |
| JP | 3110728 | 9/2000 |
| JP | 2000-277151 | 10/2000 |
| JP | 2000-294240 | 10/2000 |
| JP | 2000-294242 | 10/2000 |
| JP | 2000-323123 | 11/2000 |
| JP | 2000-323142 | 11/2000 |
| JP | 2000-327338 | 11/2000 |
| JP | 2000-327339 | 11/2000 |
| JP | 3130813 | 11/2000 |
| JP | 2000-336109 | 12/2000 |
| JP | 2001-52702 | 2/2001 |
| JP | 3181296 | 4/2001 |
| JP | 3182271 | 4/2001 |
| JP | 2001-143710 | 5/2001 |
| JP | 2001-143760 | 5/2001 |
| JP | 2001-146426 | 5/2001 |
| JP | 3197763 | 6/2001 |
| JP | 2001-185218 | 7/2001 |
| JP | 2001-282767 | 9/2001 |
| JP | 2001-345101 | 12/2001 |
| JP | 3258841 | 12/2001 |
| JP | 2002-042813 | 2/2002 |
| JP | 2002-063900 | 2/2002 |
| JP | 2002-110253 | 4/2002 |
| JP | 3301931 | 4/2002 |
| JP | 2002-151076 | 5/2002 |
| JP | 3308232 | 5/2002 |
| JP | 3318941 | 6/2002 |
| JP | 2002-260655 | 9/2002 |
| JP | 2002-529361 | 9/2002 |
| JP | 2002-530260 | 9/2002 |
| JP | 3356157 | 10/2002 |
| JP | 2002-338246 | 11/2002 |
| JP | 2002-343356 | 11/2002 |
| JP | 3378222 | 12/2002 |
| JP | 2003-238165 | 8/2003 |
| JP | 3524762 | 2/2004 |
| JP | 3536947 | 3/2004 |
| JP | 3649953 | 2/2005 |
| WO | WO 93/04996 | 3/1993 |
| WO | WO 97/26683 | 7/1997 |
| WO | WO 00/03444 | 1/2000 |
| WO | WO 00/23380 | 4/2000 |
| WO | WO 01/15252 A1 | 3/2001 |
| WO | WO 02/40404 A1 | 5/2002 |
| WO | WO 02/089234 A1 | 11/2002 |

OTHER PUBLICATIONS

Liu et al "Synthesis and characterization of LiNi1-x-yCoxMny02 as the cathode materials of secondary lithium batteries", Journal of Power Sources 81-82(1999) 416-419.*

Wiles et al., "A new computer program for Rietveld analysis of X-ray powder diffraction patterns", *J. Appl. Cryst.* (1981), 14, pp. 149-151.

Delmas et al., "Soft chemistry in $A_xMO_2$ sheet oxides", *Revue de Chimie minerale*, t. 19, (1982), pp. 343-351.

Hill et al., "Peak Shape Variation in Fixed-Wavelength Neutron Powder Diffraction and its Effect on Structural Parameters Obtained by Rietveld Analysis", *J. Appl. Cryst.* (1985) 18, pp. 173-180.

Delmas et al., "Electrochemical and physical properties of the $Li_xNi_{1-y}Co_yO_2$ phases", *Solid State Ionics* 53-56 (1992), pp. 370-375.

Rossen et al., "Structure and electrochemistry of $Li_xMn_yNi_{1-y}O_2$", *Solid State Ionics* 57 (1992), pp. 311-318.

Jones et al., "Structure and electrochemistry of $Li_xCr_yCo_{1-y}O_2$", *Solid State Ionics* 68 (1994), pp. 65-69.

Richard et al., "The effect of ammonia reduction on the spinel electrode materials, $LiMn_2O_4$ and $Li(Li_{1/3}Mn_{5/3})O_4$", *Solid State Ionics*, 73, (1994), pp. 81-91.

Armstrong et al., "Synthesis of layered $LiMnO_2$ as an electrode for rechargeable lithium batteries", *Letters to Nature*, vol. 381, Jun. 1996, pp. 499-500.

Numata et al., "Synthesis of Solid Solutions in a System of $LiCoO_2$-$Li_2MnO_3$ for Cathode Materials of Secondary Lithium Batteries", *Chemistry Letters* (1997), pp. 725-726.

Richard et al., "A Cell for In Situ X-Ray Diffraction Based on Coin Cell Hardware and Bellcore Plastic Electrode Technology", *J. Electrochem. Soc.*, vol. 144, No. 2, Feb. 1997, pp. 554-557.

Dahn et al., "Structure and Electrochemistry of $Li_2Cr_xMn_{2-x}O_4$ for $1.0 \leq x \leq 1.5$", *J. Electrochem. Soc.*, vol. 145, No. 3 (1998), pp. 851-859.

Spahr et al., "Characterization of Layered Lithium Nickel Manganese Oxides Synthesized by a Novel Oxidative Coprecipitation Method and Their Electrochemical Performance as Lithium Insertion Electrode Materials", *J. Electrochem. Soc.*, Vol. 145, No. 4, (1998), pp. 1113-1121.

Neudecker et al., "Lithium Manganese Nickel Oxides $Li_x(Mn_yNi_{1-y})_{2-x}O_2$", *J. Electrochem. Soc.*, vol. 145, No. 12, (1998), pp. 4160-4168.

Numata et al., "Synthesis and characterization of layer structured solid solutions in the system of $LiCoO_2$-$Li_2MnO_3$", *Solid State Ionics* 117, (1999), pp. 257-263.

Numata et al., "Preparation and electrochemical properties of layered lithium-cobalt-manganese oxides", *Solid State Ionics* 118, (1999), pp. 117-120.

Paulsen et al., "Layered Li-Mn-Oxide with the O2 Structure: A Cathode Material for Li-Ion Cells Which Does Not Convert to Spinel", *J. of Electrochem. Soc.*, 146 (10), (1999), pp. 3560-3565.

Cho et al., "Improvement of Structural Stability of $LiCoO_2$ Cathode during Electrochemical Cycling by Sol-Gel Coating of $SnO_2$", *Electrochem. and Solid-State Letters*, 3 (8), (2000), pp. 362-365.

Cho et al., "Novel $LiCoO_2$ Cathode Material with $Al_2O_3$ Coating for a Li Ion Cell", *Chem. Mater.*, 12, (2000), pp. 3788-3791.

Paulsen et al., "O2 Structure $Li_{2/3}[Ni_{1/3}Mn_{2/3}]O_2$: A New Layered Cathode Material for Rechargeable Lithium Batteries", *J. Electrochem. Soc.*, 147 (3) (2000), pp. 861-868.

Desilvestro et al., "Novel layered cathode materials for advanced lithium ion batteries", Pacific Lithium limited, presented at the International Li Battery Conference in Como, Italy, May 2000.

Naruoka et al., "Development of $LiNi_{1-x-y}Co_xMn_yO_2$ System Positive Active Material for Lithium Ion Cells", *GS News Technical Report*, vol. 59, No. 2, (2000), pp. 13-17.

10th International Meeting on Lithium Batteries, "Lithium 2000", Villa Erba Conference Center, Como, Italy, May 28-Jun. 2, 2000.

Quine et al., "Layered $Li_xMn_{1-y}Ni_yO_2$ intercalation electrodes", *J. Mater. Chem.*, 10, (2000), pp. 2838-2841.

Cho et al., "$LiCoO_2$ Cathode Material That Does Not Show a Phase Transition from Hexagonal to Monoclinic Phase", *J. of Electrochem. Soc.*, 148, (10), (2001), pp. A1110-A1115.

Cho et al., "Zero-Strain Intercalation Cathode for Rechargeable Li-Ion Cell", *Angew. Chem. Int. Ed.*, 40, No. 18, (2001), pp. 3367-3369.

Ohzuku et al., Layered Lithium Insertion Material of $LiCo_{1/3}Ni_{1/3}Mn_{1/3}O_2$ for Lithium-Ion Batteries, *Chemistry Letters*, vol. 30, No. 7, (2001), pp. 642-643.

Lu et al., "The Effect of Co Substitution of Ni on the Structure and Electrochemical Behavior of T2 and O2 Structure $Li_{2/3}[Co_xNi_{1/3-x}Mn_{2/3}]O_2$", *J. of Electrochem. Soc.*, 148 (3), (2001), pp. A237-A240.

Kosova et al., "Soft Mechanochemical Synthesis: Preparation of Cathode Materials for Rechargeable Lithium Batteries", *Ann. Chim. Sci. Mat.*, 27 (6), 2002, pp. 77-90.

MacNeil et al., "Structure and Electrochemistry of Li[Ni$_x$Co$_{1-2x}$Mn$_x$]O$_2$ (O $\leqq$ x $\leqq$ 1/2)", *J. of Electrochem. Soc.*, 149 (10), (2002), pp. A1332-A1336.

"How Jet Mills Operate", The Jet Pulverizer Company, pp. 1-3, dated Aug. 10, 2002, downloaded from the Internet Archive website at http://web.archive.org/web/20021013015854/http://www.jetpul.com/mequip/milloper.htm.

Jouanneau et al., "Synthesis, Characterization, and Electrochemical Behavior of Improved Li[Ni$_x$Co$_{1-2x}$Mn$_x$]O$_2$ (0.1 $\leqq$ x $\leqq$ 0.5)", *J. of Electrochem. Soc.*, 150 (12), (2003), pp. A1637-A1642.

Venkatraman et al., "Factors influencing the chemical lithium extraction rate from layered LiNi$_{1-y-z}$Co$_y$Mn$_z$O$_2$ cathodes", *Electrochem. Com.*, 6, 2004, pp. 832-837.

Jiang et al., "Electrochemical and Thermal Comparisons of Li[Ni$_{0.1}$Co$_{0.8}$Mn$_{0.1}$]O$_2$ Synthesized at Different Temperatures (900, 1000, and 1100° C.)", *J. of Electrochem. Soc.*, 152 (1), (2005), pp. A19-A22.

\* cited by examiner

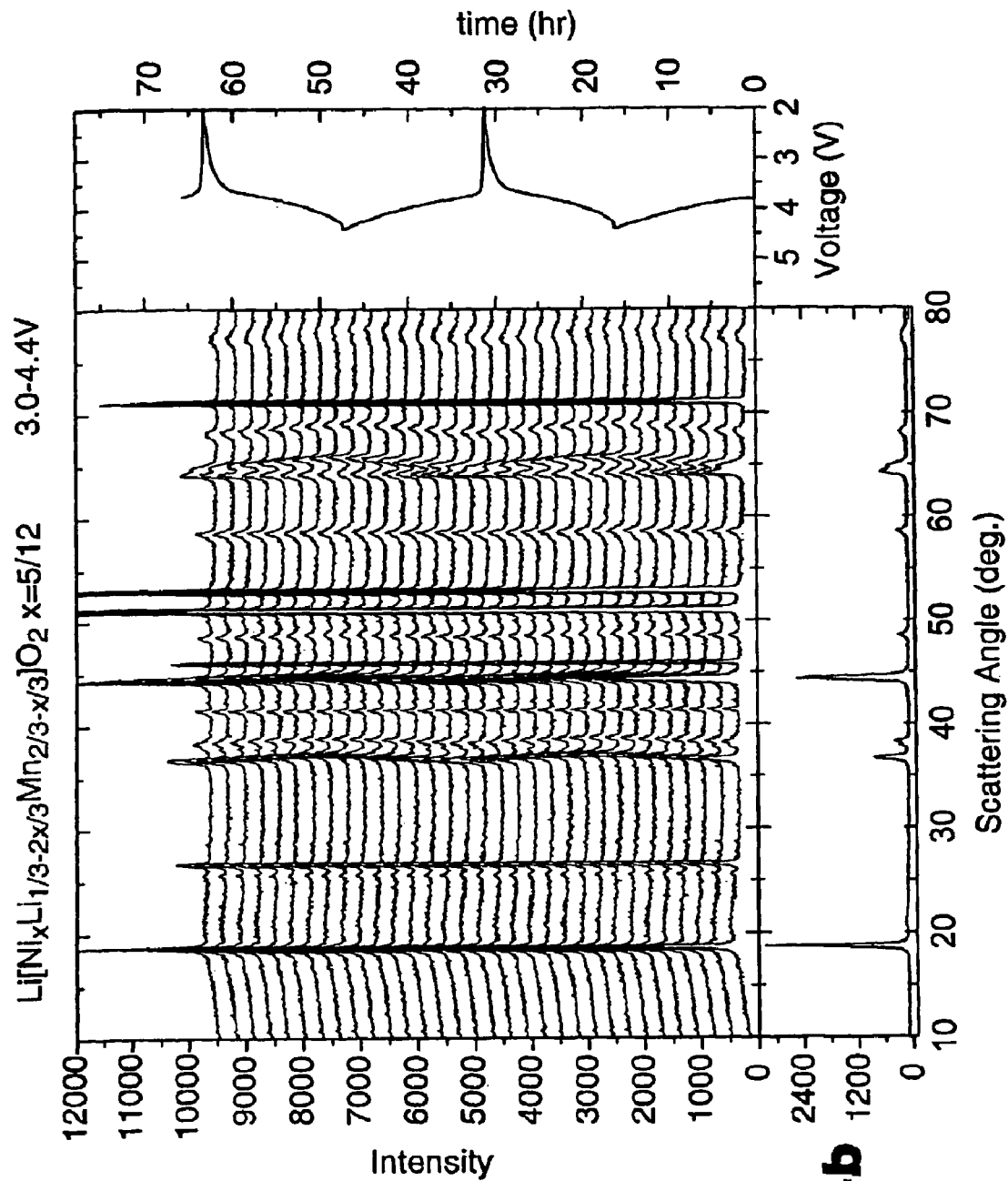

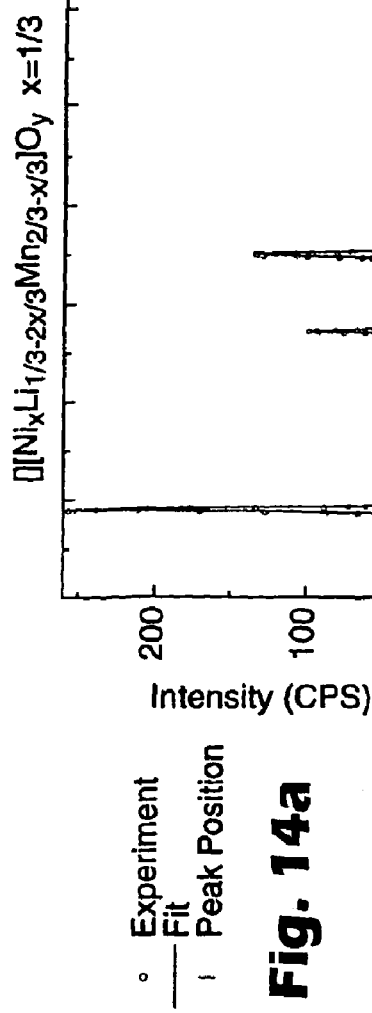
Fig. 14a
○ Experiment
— Fit
| Peak Position
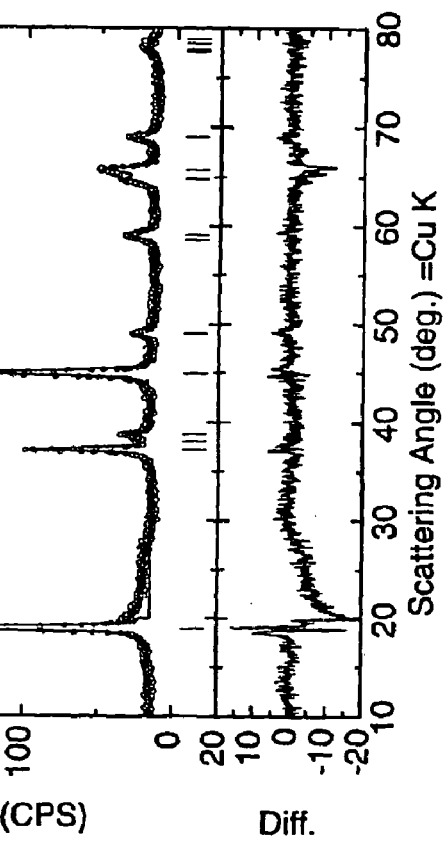
Fig. 14b
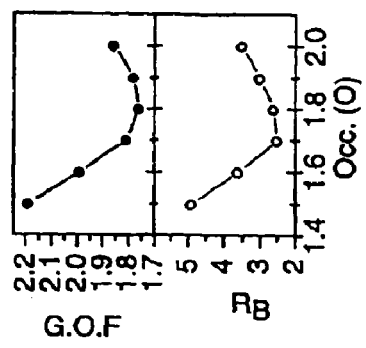
Fig. 14c
Fig. 14d

CATHODE COMPOSITIONS FOR LITHIUM ION BATTERIES

CROSS-REFERENCE TO RELATED APPLICATIONS

This application is a continuation of and claims the benefit of priority under 35 U.S.C. §120 to U.S. application Ser. No. 10/210,919 having a filing date of Aug. 2, 2002, now abandoned which claims the benefit of priority under 35 U.S.C. § 119(e) of U.S. Application No. 60/310,622, filed Aug. 7, 2001. The disclosures of the prior applications are incorporated by reference in their entirety.

TECHNICAL FIELD

This invention relates to compositions useful as cathodes for lithium ion batteries and, in another aspect, to batteries comprising the compositions.

BACKGROUND

Lithium-ion batteries typically include an anode, an electrolyte, and a cathode that contains lithium in the form of a lithium-transition metal oxide. Examples of transition metal oxides that have been used include lithium cobalt oxide, lithium nickel oxide, and lithium manganese oxide. None of these materials, however, exhibits an optimal combination of high initial capacity, high thermal stability, and good capacity retention after repeated charge-discharge cycling.

SUMMARY

In general, the invention features a cathode composition for a lithium ion battery that contains lithium having the formula (a) $Li_y[M^1_{(1-b)}Mn_b]O_2$ or (b) $Li_y[M^1_{(1-b)}Mn_b]O_{1.5+c}$ where $0 \leq y<1$, $0<b<1$ and $0<c<0.5$ and $M^1$ represents one or more metal elements, with the proviso that for (a) $M^1$ is a metal element other than chromium.

The composition is in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g. The invention also features lithium-ion batteries incorporating these cathode compositions in combination with an anode and an electrolyte.

In one embodiment of (b), $b=(2-x)/3$ and $M^1_{(1-b)}$ has the formula $Li_{(1-2x)/3}M^2_x$, where $0<x<0.5$ and $0<y<1$ and $M^2$ represents one or more metal elements, with the proviso that the weighted average oxidation state of all $M^2$ is 2 when in a fully uncharged state and 4 when in a fully charged state. The resulting cathode composition has the formula $Li_y[Li_{(1-2x)/3}M^2_xMn_{(2-x)/3}]O_{1.5+x}$. An example of $M^2$ is nickel.

In a second embodiment of (a); b, $M^1_{(1-b)}$, $M^2$ and x are defined as in the first embodiment, with the proviso that $(1-2x) \leq y<1$ and $M^2$ is a metal element other than chromium. The resulting cathode composition has the formula $Li_y[Li_{(1-2x)/3}M^2_xMn_{(2-x)/3}]O_2$. An example of $M^2$ is nickel.

In a third embodiment of (b); b, $M^1_{(1-b)}$, $M^2$ and x are defined as in the first embodiment, with the proviso that $0<y<(1-2x)$, $0<a<(1-y)$ and $M^2$ is a metal element other than chromium. The resulting cathode has the formula $Li_{y+a}[Li_{(1-2x)/3}M^2_xMn_{(2-x)/3}]O_{1.5+x+y/2}$. An example of $M^2$ is nickel.

In a fourth embodiment of (b); b, $M^1_{(1-b)}$, $M^2$ and x are defined as in the first embodiment, with the proviso that $0<y<(1-2x)$. The resulting cathode composition has the formula $Li_y[Li_{(1-2x)/3}M^2_xMn_{(2-x)/3}]O_{1.5+x+y/2}$. An example of $M^2$ is nickel.

In a fifth embodiment of (b); $b=(2-2x)/3$ and $M^1_{(1-b)}$ has the formula $Li_{(1-x)/3}M^2_x$, where $0<x<1$ and $0<y<1$ and $M^2$ represents one or more metal elements, with the proviso that the weighted average oxidation state of all $M^2$ is 3 when in a fully uncharged state and 4 when in a fully charged state. The resulting cathode composition has the formula $Li_y[Li_{(1-x)/3}M^2_xMn_{(2-2x)/3}]O_{1.5+x/2}$. Examples of $M^2$ are Co or Fe and combinations thereof.

In a sixth embodiment of (b); $b=(2-2x)/3$ and $M^1_{(1-b)}$ has the formula $Li_{(1-x)/3}M^2_x$, $0<a<(1-y)$, $0<x<1$, $0<y<(1-x)$ and $M^2$ represents one or more metal elements, with the proviso that the weighted average oxidation state of all $M^2$ is 3 when in a fully uncharged state and 4 when in a fully charged state. The resulting cathode composition has the formula $Li_{y+a}[Li_{(1-x)/3}M^2_xMn_{(2-2x)/3}]O_{1.5+x/2+y/2}$. Examples of $M^2$ are Co or Fe and and combinations thereof.

In a seventh embodiment of (a); b, $M^1_{(1-b)}$, $M^2$ and x are defined as in the fifth embodiment with the proviso that $(1-x) \leq y<1$ and $M^2$ is a metal element other than chromium. The resulting cathode composition has the formula $Li_y[Li_{(1-x)/3}M^2_xMn_{(2-2x)/3}]O_2$. Examples of $M^2$ are Co or Fe and combinations thereof.

In an eighth embodiment of (b); b, $M^1_{(1-b)}$, $M^2$ and x are defined as in the fifth embodiment, with the proviso that $0 \leq y<(1-x)$. The resulting cathode composition has the formula $Li_y[Li_{(1-x)/3}M^2_xMn_{(2-2x)/3}]O_{1.5+x/2+y/2}$. Examples of $M^2$ are Co or Fe and combinations thereof.

In a ninth embodiment of (b); $b=(2-2x)/3$ and $M^1_{(1-b)}$ has the formula $Li_{(1-x)/3}M^2_x$, where $0<x<0.33$ and $0<y<1$ and $M^2$ represents one or more metal elements, with the proviso that the weighted average oxidation state of all $M^2$ is 3 when in a fully uncharged state and 6 when in a fully charged state. The resulting cathode composition has the formula $Li_y[Li_{(1-x)/3}M^2_xMn_{(2-2x)/3}]O_{1.5+1.5x}$. An example of $M^2$ is chromium.

In a tenth embodiment of (b); ); $b=(2-2x)/3$ and $M^1_{(1-b)}$ has the formula $Li_{(1-x)/3}M^2_x$, $0<a<(1-y)$, $0<x<0.33$, $0<y<(1-3x)$, and $M^2$ represents one or more metal metal elements, with the proviso that the weighted average oxidation state of all $M^2$ is 3 when in a fully uncharged state and 6 when in a fully charged state. The resulting cathode composition has the formula $Li_{y+a}[Li_{(1-x)/3}M^2_xMn_{(2-2x)/3}]O_{1.5+1.5x+y/2}$. An example of $M^2$ is $M_2$ chromium.

In an eleventh embodiment of (b); $b=(2-2x)/3$ and $M^1_{(1-b)}$ has the formula $Li_{(1-x)/3}M^2_x$, where $0<x<0.33$ and $0<y<(1-3x)$ and $M^2$ represents one or more metal elements, with the proviso that the weighted average oxidation state of all $M^2$ is 3 when in a fully uncharged state and 6 when in a fully charged state. The resulting cathode composition has the formula $Li_y[Li_{(1-x)/3}M^2_xMn_{(2-2x)/3}]O_{1.5+1.5x+y/2}$. An example of $M^2$ is chromium.

The invention provides cathode compositions, and lithium-ion batteries incorporating these compositions, that exhibit high initial capacities and good capacity retention after repeated charge-discharge cycling. In addition, the cathode compositions do not evolve substantial amounts of heat during elevated temperature abuse, thereby improving battery safety. The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 are in-situ x-ray diffraction results for the first two charge-discharge cycles of Li[Ni$_x$Li$_{(1/3-2x/3)}$Mn$_{(2/3-x/3)}$]O$_2$ with x=5/12 between 3.0 and 4.4 V. The lower panel shows the diffraction pattern of the starting powder. The in-situ scans are synchronized with the voltage-time curve to the right. For example, the 8th x-ray scan took place at the top of the first charge as indicated.

FIG. 14 is an ex-situ x-ray diffraction pattern of Li[Ni$_x$Li$_{(1-2x)/3}$Mn$_{(2-x)/3}$]O$_2$ with x=1/3 charged to 4.8 V. The estimated stoichiometry of the sample at this potential based on oxidation state arguments (see table 1) is [Ni$_{0.33}$Li$_{0.113}$Mn$_{0.556}$]O$_{1.833}$. The calculated pattern is shown as the solid line. The insets show the variation of the goodness of fit (G.O.F.) and the Bragg-R factor versus the occupation of the oxygen sites.

DETAILED DESCRIPTION

Figures 1A, 1B, 1C, 1D, 1E:
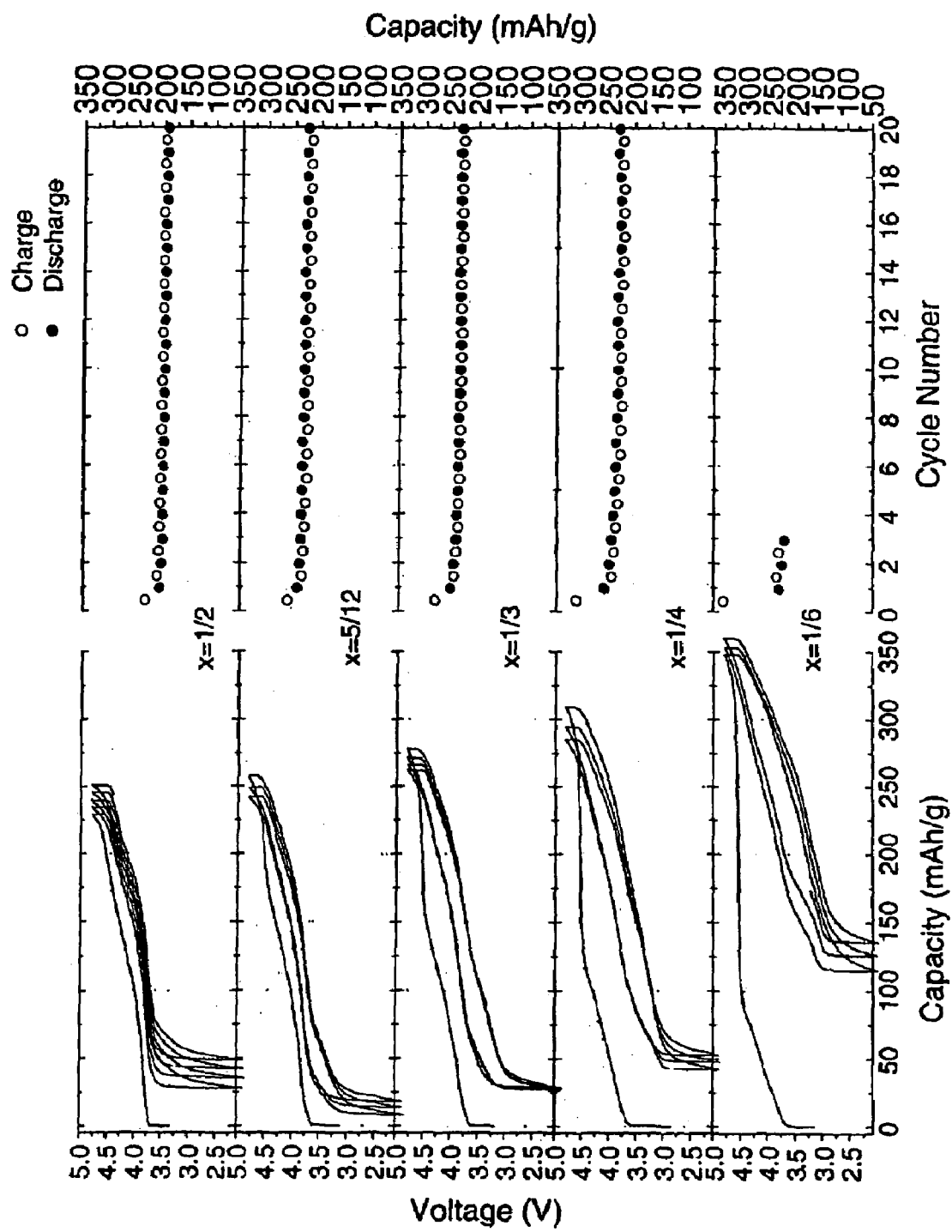
FIG. 1 is a plot of voltage versus capacity and capacity versus cycle number for Li/Li[Ni$_x$Li$_{(1/3-2x/3)}$Mn$_{(2/3-x/3)}$]O$_2$ cells with x=1/6, 1/4, 1/3, 5/12 and 1/2. The cycling is between 2.0 and 4.8 V at 5 mA/g.

Cathode compositions have the formulae set forth in the Summary of the Invention, above. The formulae themselves, as well as the choice of particular metal elements, and combinations thereof, for M$^1$ and M$^2$, reflect certain criteria that the inventors have discovered are useful for maximizing cathode performance. First, the cathode compositions preferably adopt an O3 crystal structure featuring layers generally arranged in the sequence lithium-oxygen-metal-oxygen-lithium. This crystal structure is retained when the cathode composition is incorporated in a lithium-ion battery and cycled for 100 full charge-discharge cycles at 30° C. and a final capacity of 130 mAh/g using a discharge current of 30 mA/g, rather than transforming into a spinel-type crystal structure under these conditions. In addition, to maximize rapid diffusion in the lithium layers, and thus battery performance, it is preferred to minimize the presence of metal elements in the lithium layers. It is further preferred that at least one of the metal elements be oxidizable within the electrochemical window of the electrolyte incorporated in the battery.

The cathode compositions may be synthesized by electrochemically cycling cathode material described in Dahn, et. al. U.S. Ser. No. 09/845,178 entitled "Improved Cathode Compositions For Lithium Ion Batteries", filed Apr. 23, 2001 and hereby incorporated by reference in its entirety.

Particularly preferred cathode compositions are those having the following formulae (where weighted average oxidation state of all M$^2$ is 2 when in a fully uncharged state and 4 when in a fully charged state):

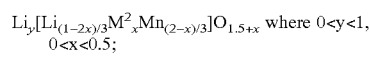
Li$_y$[Li$_{(1-2x)/3}$M$^2_x$Mn$_{(2-x)/3}$]O$_{1.5+x}$ where 0<y<1, 0<x<0.5;

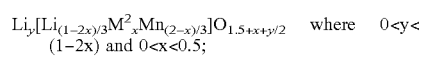
Li$_y$[Li$_{(1-2x)/3}$M$^2_x$Mn$_{(2-x)/3}$]O$_{1.5+x+y/2}$ where 0<y< (1-2x) and 0<x<0.5;

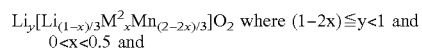
Li$_y$[Li$_{(1-x)/3}$M$^2_x$Mn$_{(2-2x)/3}$]O$_2$ where (1-2x)≤y<1 and 0<x<0.5 and

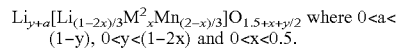
Li$_{y+a}$[Li$_{(1-2x)/3}$M$^2_x$Mn$_{(2-x)/3}$]O$_{1.5+x+y/2}$ where 0<a< (1-y), 0<y<(1-2x) and 0<x<0.5.

The cathode compositions are combined with an anode and an electrolyte to form a lithium-ion battery. Examples of suitable anodes include lithium metal, graphite, and lithium alloy compositions, e.g., of the type described in Turner, U.S. Pat. No. 6,203,944 entitled "Electrode for a Lithium Battery" and Turner, WO 00/03444 entitled "Electrode Material and Compositions." The electrolyte may be liquid or solid. Examples of solid electrolytes include polymeric electrolytes such as polyethylene oxide, polytetrafluoroethylene, fluorine-containing copolymers, and combinations thereof. Examples of liquid electrolytes include ethylene carbonate, diethyl carbonate, propylene carbonate, and combinations thereof. The electrolyte is provided with a lithium electrolyte salt. Examples of suitable salts include $LiPF_6$, $LiBF_4$, and $LiClO_4$.

Specifically the electrochemical behavior of $Li/Li[Ni_xLi_{(1/3-2x/3)}Mn_{(2/3-x/3)}]O_2$ cells for x=⅙, ¼, ⅓, 5/12 and ½ is described herein. $Li/Li[Ni_xLi_{(1/3-2x/3)}Mn_{(2/3-x/3)}]O_2$ is derived from $Li_2MnO_3$ or $Li[Li_{1/3}Mn_{2/3}]O_2$ by substitution of $Li^+$ and $Mn^{4+}$ by $Ni^{2+}$ while maintaining all the remaining Mn atoms in the 4+ oxidation state. Conventional wisdom suggests that lithium can be removed from these materials only until both the Ni and Mn oxidation states reach $4^+$ giving a charge capacity of 2y. We show that $Li/Li[Ni_xLi_{(1/3-2x/3)}Mn_{(2/3-x/3)}]O_2$ cells give smooth reversible voltage profiles reaching about 4.45 V when 2x Li atoms per formula unit are removed, as expected. If the cells are charged to higher voltages, surprisingly they exhibit a long plateau of length approximately equal to 1–2x in the range between 4.5 and 4.7 V. Subsequent to this plateau the materials can reversibly cycle over 225 mAh/g (almost one Li atom per formula unit) between 2.0 and 4.8 V. In-situ x-ray diffraction and differential capacity measurements are used to infer that irreversible loss of oxygen from the compounds with x<½ occurs during the first charge to 4.8 V. This results in oxygen deficient layered materials with stoichiometry approximately equal to $[Li_y][Ni_xLi_{(1-2x)/3}Mn_{(2-x)/3}]O_{1.5+x}$ at 4.8 V where x is approximately equal to zero. These oxygen deficient materials then reversibly react with lithium.

In a prior application U.S. Ser. No. 09/845,178 we introduced the layered cathode materials $Li[Ni_xLi_{(1-2x)/3}Mn_{(2-x)/3}]O_2$ for x=⅓, 5/12 and ½. These materials form part of the solid solution series $Li[Ni_xLi_{(1-2x)/3}Mn_{(2-x)/3}]O_2$ for 0<x<½, where Ni is thought to be in the $2^+$ oxidation state and Mn in the $4^+$ oxidation state. In our notation, the compound contains cation layers that alternate between predominantly pure Li and $[Ni_xLi_{(1-2x)/3}Mn_{(2-x)/3}]$. In U.S. Ser. No. 09/845,178 we showed that these materials exhibit excellent cycling performance and safety characteristics, and suggested they could be inexpensively synthesized.

$Li[Ni_xLi_{(1/3-2x/3)}Mn_{(2/3-x/3)}]O_2$ is derived from $Li_2MnO_3$ or $Li[Li_{1/3}Mn_{2/3}]O_2$ by substitution of $Li^+$ and $Mn^{4+}$ by $Ni^{2+}$ while maintaining all the remaining Mn atoms in the 4+ oxidation state. Similar materials containing $Cr^{3+}$ like $Li[Cr_xLi_{(1/3-x/3)}Mn_{(2/3-2x/3)}]O_2$ with x=0.4 and containing $Co^{3+}$, like $Li[Co_yLi_{(1/3-y/3)}Mn_{(2/3-2y/3)}]O_2$ (0≦y ≦1) have been reported. In these materials the electrochemical activity during the first extraction of lithium is thought to be derived from the oxidation of Ni ($Ni^{2+} \rightarrow Ni^{4+}$, Cr ($Cr^{3+} \rightarrow Cr^{6+}$ [4,5]) or Co ($Co^{3+} \rightarrow Co^{4+}$). These oxidation state changes, therefore, set limits for the maximum amount of Li that can be extracted from the compounds in a conventional intercalation process. For example, the Ni oxidation state reaches 4+ at the stoichiometry $Li_{1-2x}[Ni_xLi_{(1-2x)/3}Mn_{(2-x)/3}]O_2$, leading to an expected reversible capacity of 2x Li per formula unit.

FIG. 1 shows the voltage-capacity curves of $Li/Li[Ni_xLi_{(1-2x)/3}Mn_{(2-x)/3}]O_2$ cells for x=⅙, ¼, ⅓, 5/12 and ½. There is a clear change in slope of the voltage profile of the first charge near 4.45 V, followed by an irreversible plateau (except for x=½), whose length increases as x decreases. The capacity of the first charge between 3.0 V and 4.45 V in the sloping portion of the curve is very near to that expected when Ni reaches 4+, as we will show later below. Therefore, the origin of the long plateau is mysterious, but useful, because it leads to materials with considerably greater reversible capacity. The compositions involved in this irreversible plateau is the focus of this application.

Similar anomalous plateaus have been observed before, for example, M. N. Richard, E. W. Fuller and J. R. Dahn, Solid State Ionics, 73, 81 (1994) observed a long irreversible plateau when $Li_{4/3}Mn_{5/3}O_4$ (all Mn in 4+ oxidation state) prepared from $MnCO_3$ was charged to high voltage. This was followed by an increase in cycling capacity over the original voltage window (See FIGS. 8, 11 and 13 in the Richard, et. al. reference). Those authors speculated that the simultaneous extraction of Li and oxygen occurred during the anomalous plateau, leading to a fixed Mn oxidation state of $4^+$ along the plateau. We adopt a similar hypothesis here, and show that all experiments on $Li/Li[Ni_xLi_{(1/3-2x/3)}Mn_{(2/3-x/3)}]O_2$ cells are consistent with it.

Figures 2A, 2B, 2C, 2D, 2E:
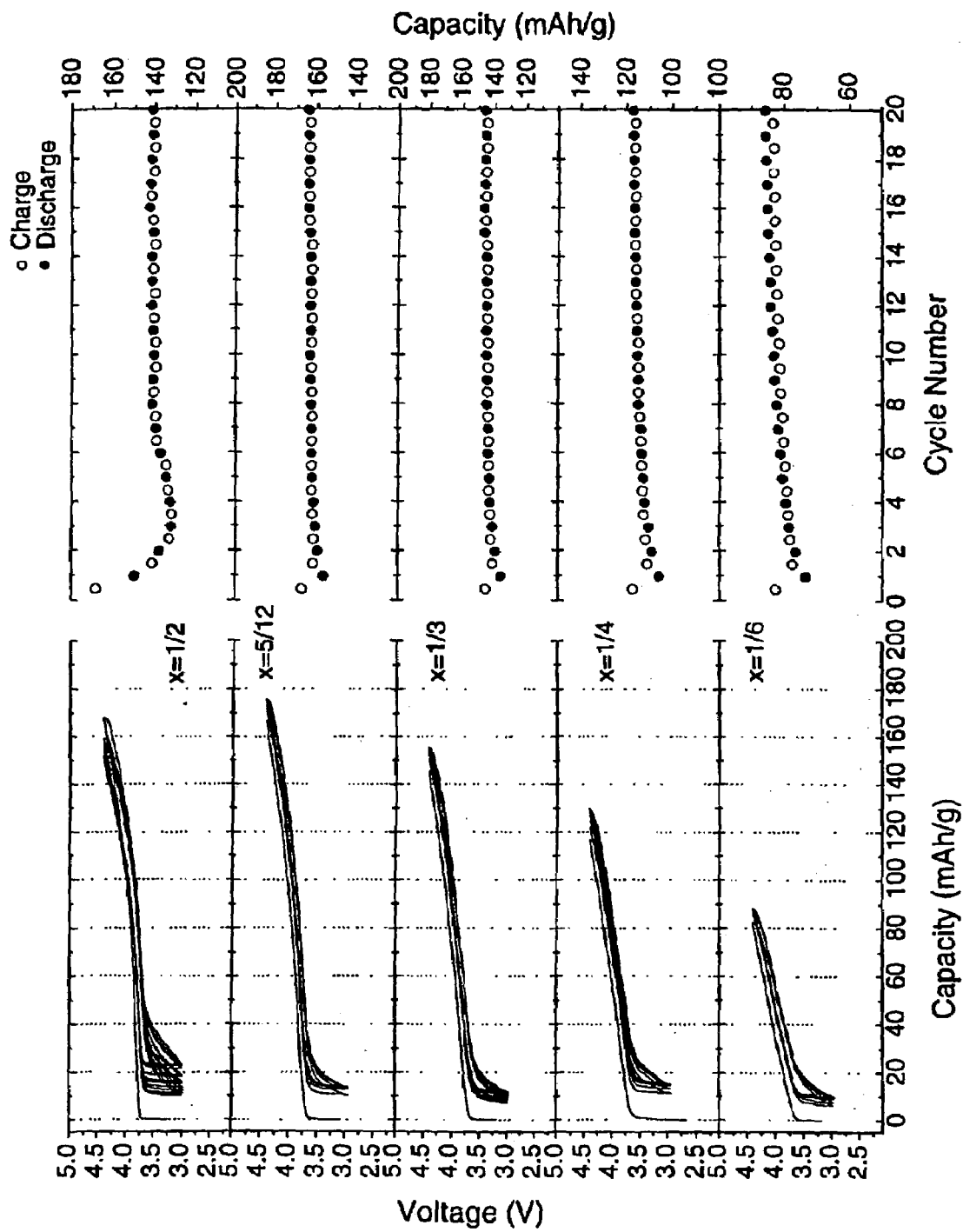
FIG. 2 is a plot of voltage versus capacity and capacity versus cycle number for Li/ Li[Ni$_x$Li$_{(1/3-2x/3)}$Mn$_{(2/3-x/3)}$]O$_2$ cells with x=1/6, 1/4, 1/3, 5/12 and 1/2. The cycling was between 3.0 and 4.4 V at 10 mA/g.

Our first objective was to confirm that the removal of lithium from $Li[Ni_xLi_{(1-2x)/3}Mn_{(2-x)/3}]O_2$ over the range where the oxidation state of Ni is expected to be less than 4+ is a conventional intercalation process. FIG. 2 shows the voltage versus capacity for $Li/Li[Ni_xLi_{(1/3-2x/3)}Mn_{(2/3-x/3)}]O_2$ (x=⅙, ¼, ⅓, 5/12, ½) cells between 3.0 and 4.4 V using a specific current of 10 mA/g. The capacity versus cycle number is also shown for the same cells in the right hand panels of the figure. The voltage profiles are smooth and the cells show excellent reversibility.

Figure 3:
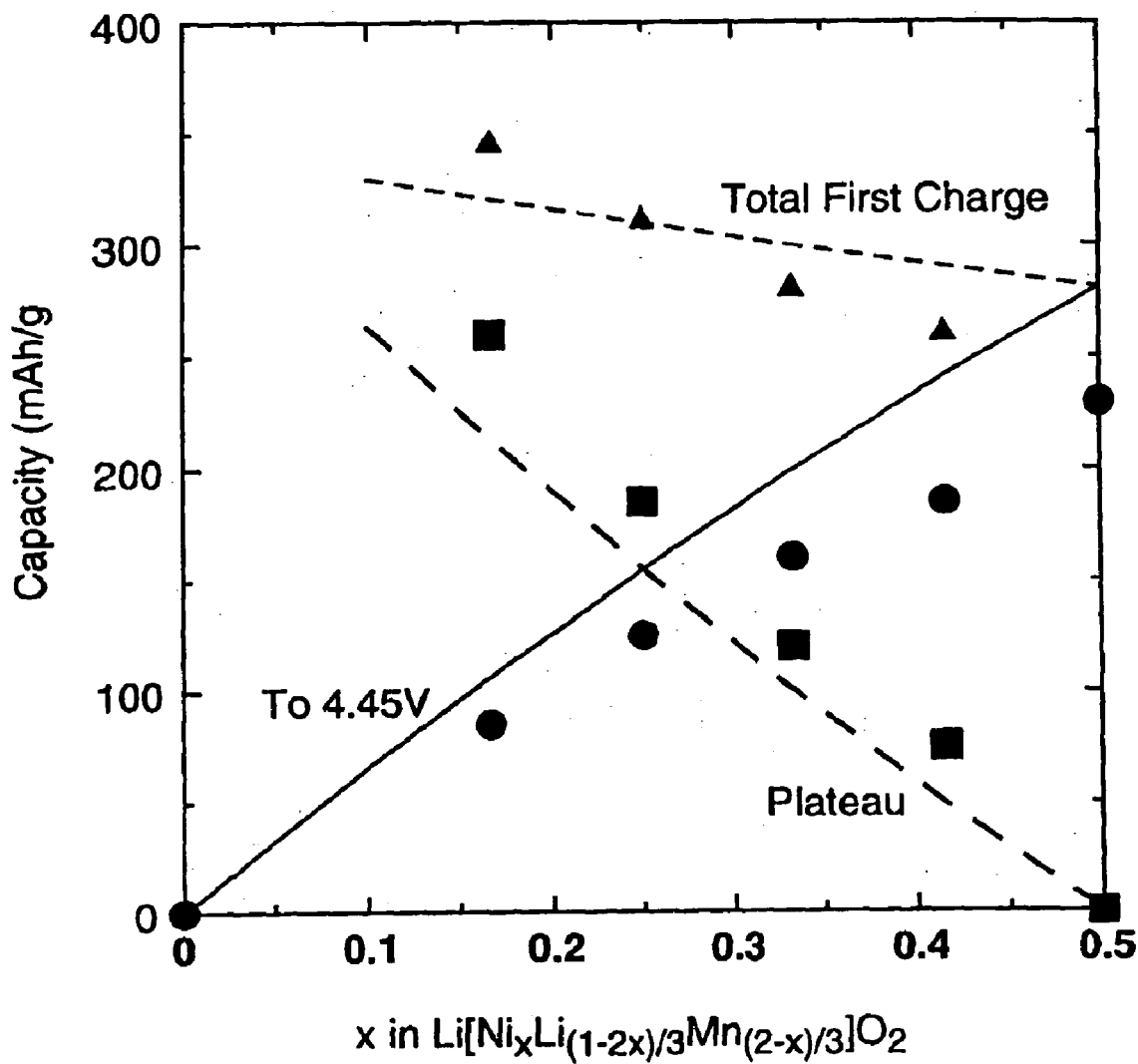
FIG. 3 is a plot of specific capacity versus x in Li[Ni$_x$Li$_{(1/3-2x/3)}$Mn$_{(2/3-x/3)}$]O$_2$ over various voltage ranges. The solid and dashed lines as indicated give expected capacities. The circles give the experimental capacity to 4.45 V, the squares give the experimental capacity of the anomalous plateau and the triangles give the experimental first charge capacity.

The solid line in FIG. 3 shows the capacity expected before the Ni oxidation state equals +4 plotted versus x in $Li[Ni_xLi_{(1/3-2x/3)}Mn_{(2/3-x/3)}]O_2$. This occurs at the stoichiometry $Li_{1-2x}[Ni_xLi_{(1-2x)/3}Mn_{(2-x)/3}]O_2$. The circular data points in FIG. 3 give the capacity to 4.45 V in FIG. 1, which corresponds to the capacity of the reversible cycling range in FIG. 2, except for the data for x=½ which is taken as the full capacity shown in FIG. 1. There is good agreement between the prediction and the measured capacities, suggesting that $Ni^{2+}$ is oxidized to $Ni^{4+}$ during the portion of the charge to 4.45 V.

Figures 5A, 5B, 5C:
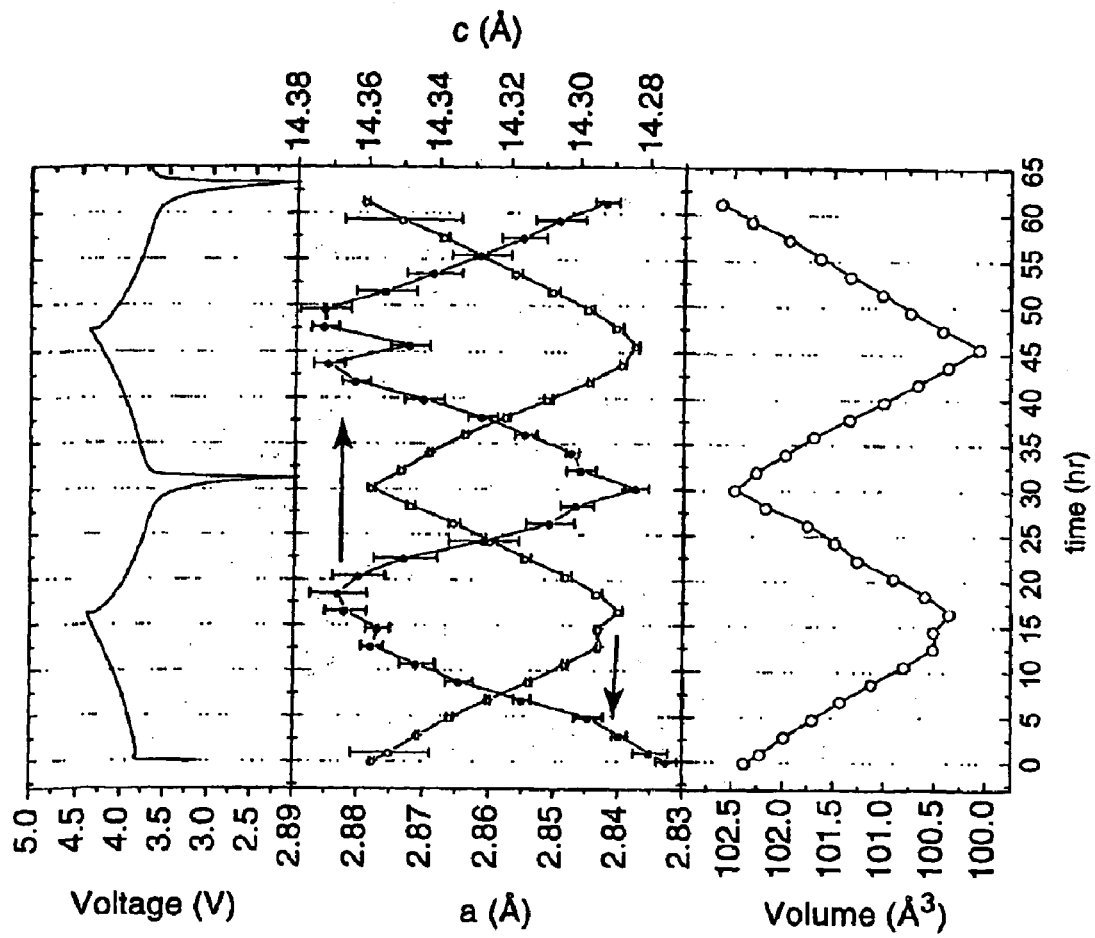
FIG. 5 are in-situ x-ray diffraction results for Li[Ni$_x$Li$_{(1/3-2x/3)}$Mn$_{(2/3-x/3)}$]O$_2$ with x=5/12. a) the voltage-time curve; b) the lattice constants a and c; and c) the unit cell volume correlated to the voltage-time curve. The cell was cycled between 3.0 and 4.4 V

FIG. 4 shows in-situ x-ray diffraction results for a $Li/Li[Ni_xLi_{(1-2x)/3}Mn_{(2-x)/3}]O_2$ cell with x=5/12, cycled two times between 2.0 and 4.4 V. All changes to the Bragg peak positions appear to be completely reversible, as expected in an intercalation process. FIG. 5 shows the lattice constants and the unit cell volume correlated to the voltage profile. Within the error of the experiment, the changes to the lattice constants and the unit cell volume appear to be reversible as lithium is removed from and added to the compound.

Figures 6A, 6B, 6C, 6D, 6E:
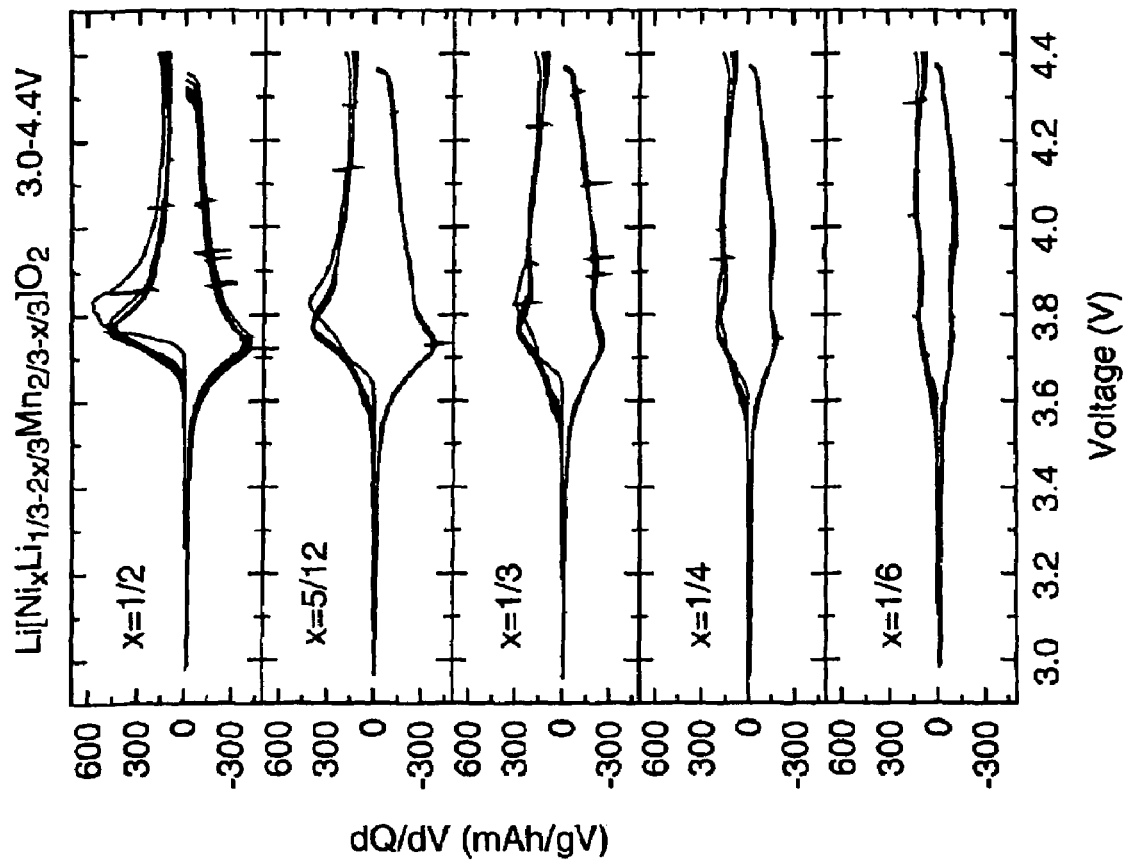
FIG. 6 is a plot of differential capacity versus voltage for Li/Li[Ni$_x$Li$_{(1/3-2x/3)}$Mn$_{(2/3-x/3)}$]O$_2$ cells with x as indicated. The cells were charged and discharged between 3.0 and 4.4 V using a specific current of 10 mA/g.

FIG. 6 shows the differential capacity versus voltage for the $Li/Li[Ni_xLi_{(1-2x)/3}Mn_{(2-x)/3}]O_2$ cells cycled between 3.0 and 4.4 V. Apart from small differences between the first charge cycle and later cycles thought to be caused by the impedance of the uncycled Li electrode in the freshly assembled cells, the differential capacity is perfectly repeatable for numerous cycles, suggesting a stable intercalation process for all these materials.

FIG. 1 clearly shows that there is excess capacity available in these samples above 4.45 V which occurs as a plateau between 4.5 and 4.7 V during the first charge cycle. The length of the plateau capacity is plotted versus x in $Li[Ni_xLi_{(1/3-2x/3)}Mn_{(2/3-x/3)}]O_2$ as the squares in FIG. 3. The plateau capacity decreases smoothly with x. If the plateau occurs once the Ni oxidation state reaches 4+, or at the stoichiometry $Li_{1-2x}[Ni_xLi_{(1-2x)/3}Mn_{(2-x)/3}]O_2$, then the plateau should have a length of 1−2x per formula unit, if all Li atoms can be removed from the Li layers and provided that Li atoms cannot be extracted from the predominantly transition metal layer. This prediction is given as the long dashed line in FIG. 3 and agrees well with the square data points which are the experimental plateau capacities from FIG. 1 Finally, the total capacity of the first charge of the cells described by FIG. 1 is given as the triangles in FIG. 3, and compared to the capacity expected if all the Li atoms could be extracted from the Li layers. The agreement is quite good.

The results in FIGS. 1-6 suggest that when the Ni oxidation state is below 4+, the compounds show reversible cycling in an intercalation process. Once the Ni oxidation state reaches 4+(near 4.45 V), it appears that further Li can be extracted, up to the limit when all the Li has been extracted from the Li layers. There are some questions that must be answered, however. First, what happens to the transition metal oxidation states along the plateau? Second, why is the subsequent cycling after the cells have first been charged to 4.8 V so different than the initial charge (see FIG. 1)? Third, is it true that lithium is being extracted during the plateau, as we hypothesize? To address these questions, further in-situ XRD experiments were made.

FIG. 7 shows analyzed in-situ x-ray diffraction results for a $Li/Li[Ni_xLi_{(1-2x)/3}Mn_{(2-x)/3}]O_2$ cell with x=5/12, cycled two times between 2.0 and 4.8 V. The lattice constant and the unit cell volume changes are correlated to the voltage profile. Near 4.8 V, the c-axis begins to decrease rapidly, consistent with the behaviour observed (for example in $LiCoO_2$) when the last lithium atoms are removed from the lithium layers. In addition, during the plateau near 4.6 V, the a-axis remains almost constant, while the c-axis is changing. The plateau cannot correspond entirely to a parasitic side reaction involving the electrolyte, because clearly the lithium content of the material is changing. Both the clear plateau near 4.6 V and the region of constant a-axis are not observed during the second charge. Some irreversible change has occurred in the electrode during its charge to 4.8V.

Figures 8A, 8B, 8C:
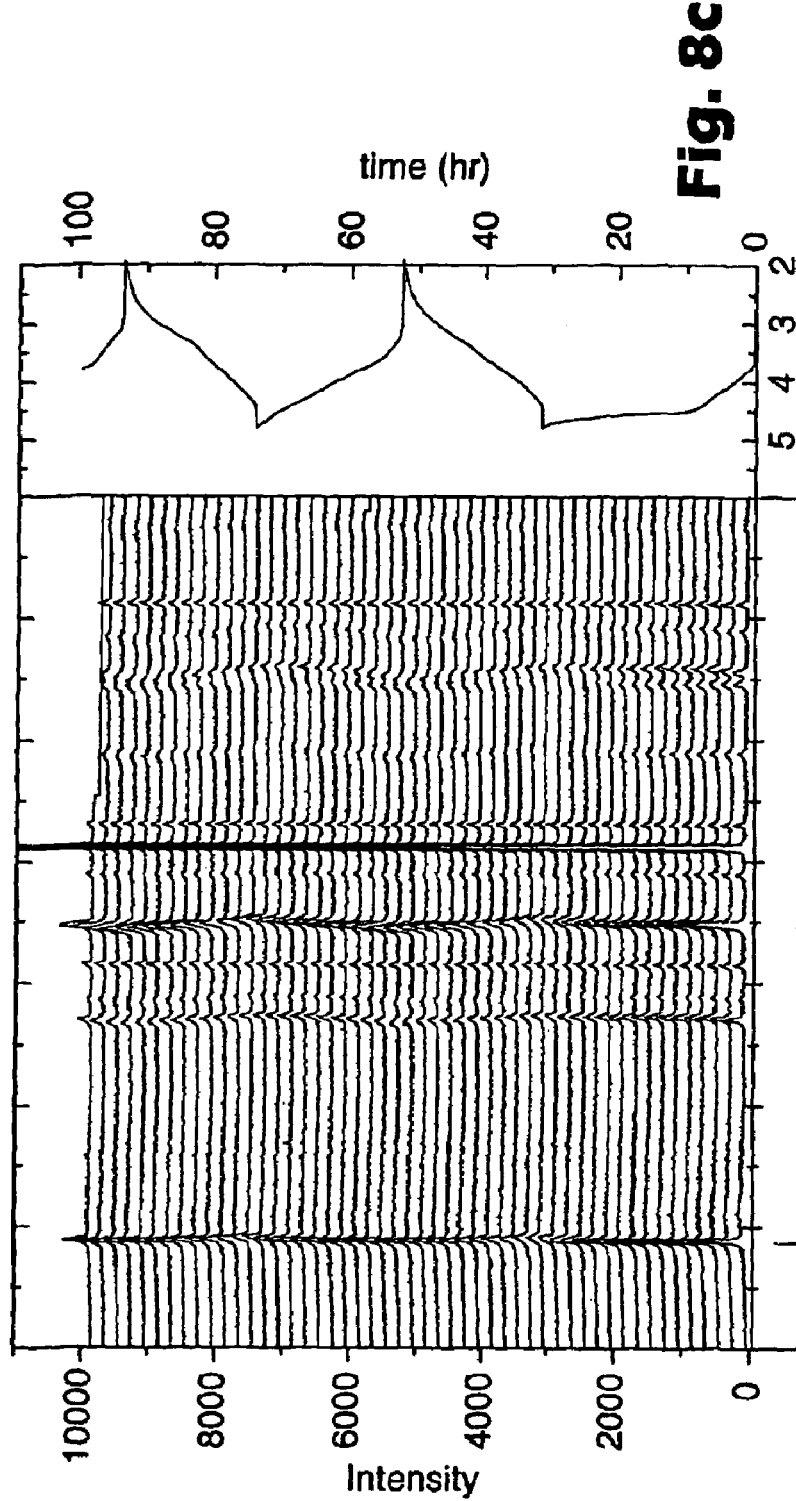
FIG. 8 are in-situ x-ray diffraction results for the first two charge-discharge cycles of Li[Ni$_x$Li$_{(1/3-2x/3)}$Mn$_{(2/3-x/3)}$]O$_2$ with x=1/6 between 2.0 and 4.8 V. The lower panel shows the diffraction pattern of the starting powder. The in-situ scans are synchronized with the voltage-time curve to the right. For example, the 16th x-ray scan took place at the top of the first charge as indicated.
Figures 9A, 9B, 9C:
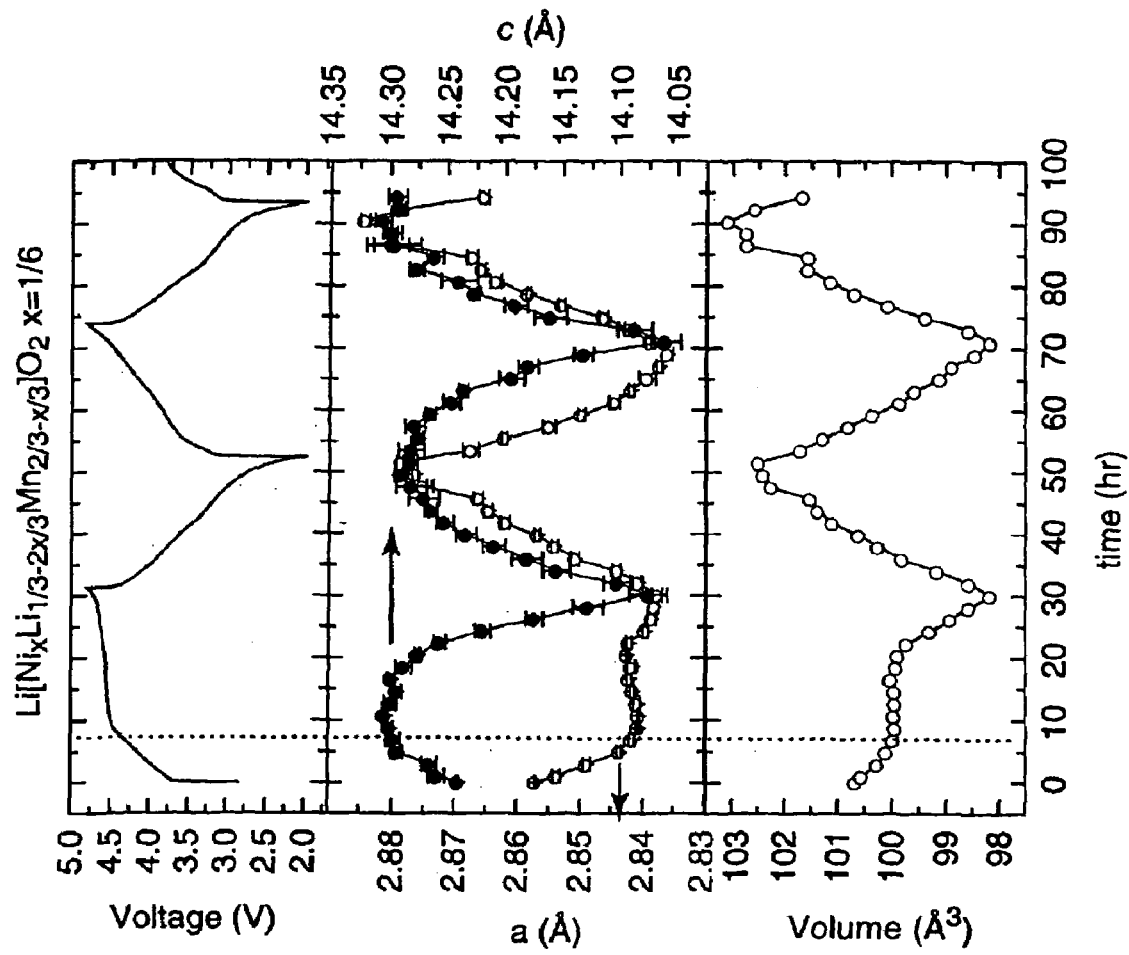
FIG. 9 are in-situ x-ray diffraction results for Li[Ni$_x$Li$_{(1/3-2x/3)}$Mn$_{(2/3-x/3)}$]O$_2$ with x=1/6. a) the voltage-time curve; b) the lattice constants a and c; and c) the unit cell volume correlated to the voltage-time curve. The cell was cycled between 2.0 and 4.8 V.

In order to observe these changes more clearly, we carried out the same experiments on the sample with x=1/6, where the plateau is very pronounced. FIG. 8 shows the raw in-situ XRD results and FIG. 9 shows the lattice constants and unit cell volume correlated to the cell voltage profile. Both FIGS. 8 and 9 clearly show that the structure of the material, as evidenced by the diffraction pattern and the lattice constants, in the discharged state (53 hours) is different from the virgin sample. In particular, the unit cell volume (FIG. 9c) is much larger than in the original material. FIG. 9 also shows that the a-axis does not change significantly during the plateau in the first charge between 4.5 and 4.7 V, even while the c-axis decreases rapidly. The rapid decrease in the c-axis near 4.8 V suggests again that most of the Li has been extracted from between the Li layers.

The results in FIGS. 7, 8 and 9 suggest several things. First, the rapid decrease in the c-axis near 4.8 V suggests that most of the Li is being removed from the Li layers, consistent with the cell capacities, as shown in FIG. 3. The a-axis decreases smoothly with lithium content during the first charge until the anomalous plateau is reached in both FIGS. 7 and 9. The a-axis presumably decreases because the $Ni^{4+}$ formed during charge is smaller than $Ni^{2+}$. Once the plateau is reached, the a-axis remains approximately constant, suggesting that the transition metal oxidation states are not changing during the plateau. If the transition metal oxidation states do not change, then the charge removed must come from the oxygen atoms and therefore the removal of lithium must be accompanied by the expulsion of oxygen from the structure along this plateau. This expelled oxygen may react with the cell electrolyte, and may be responsible for clear correlation between the length of the anomalous plateau in FIG. 1 and the irreversible capacity for the samples with x=1/6, 1/3, 1/4 and 5/12.

The simultaneous expulsion of both lithium and oxygen from the compound during the plateau is surprising and there may be readers who require further proof that this occurs. This proof can be found in a careful study of the voltage profiles in FIG. 1 and a further examination of the in-situ x-ray diffraction results in FIGS. 7 and 9. However, before doing this, it is useful to consider the stoichiometry of the materials at 4.8 V.

Figure 10:
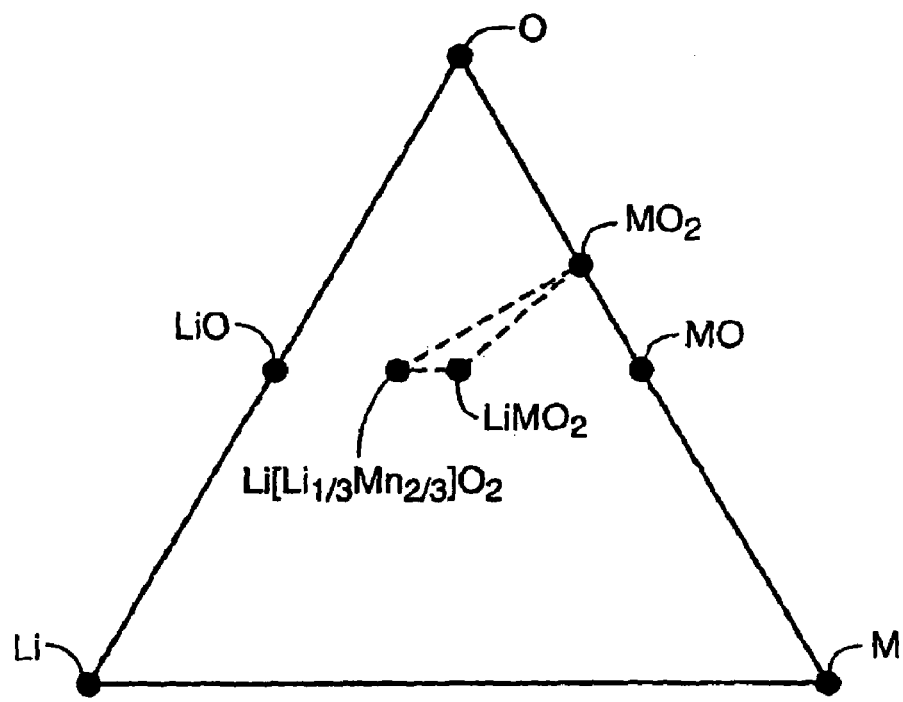
FIG. 10 is a Gibbs triangle for the Li-M-O ternary system with M representing Ni$_x$Mn$_{(2/3-x/3)}$. The compositions of relevant phases are indicated.
Figure 11:
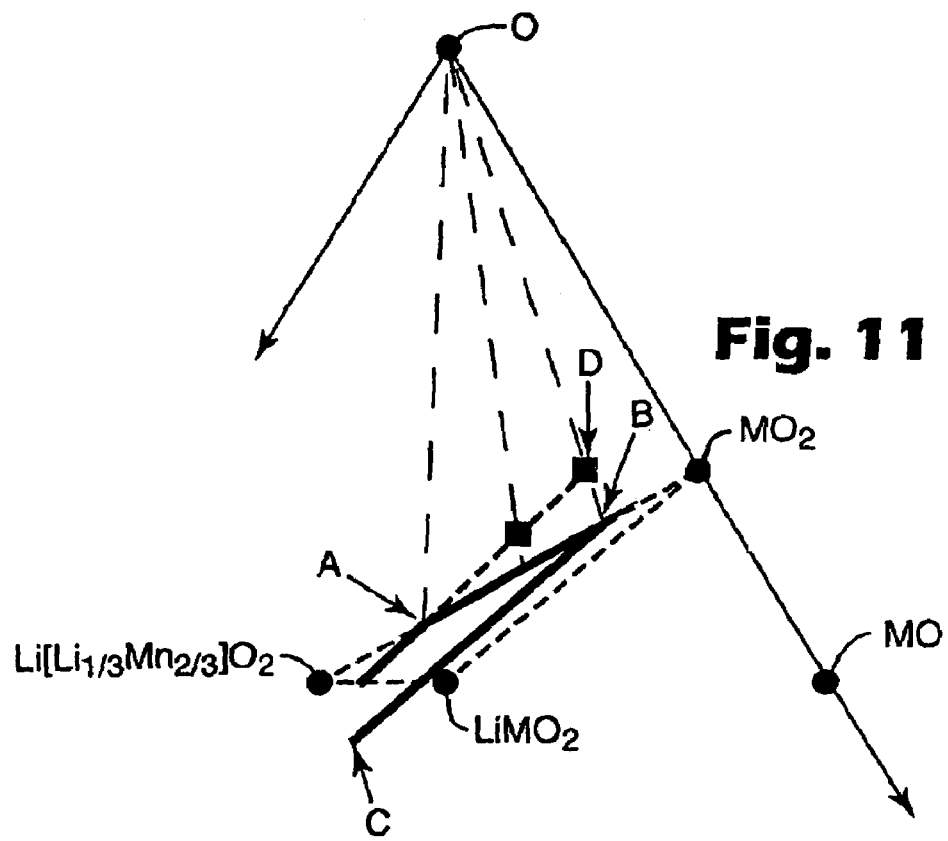
FIG. 11 is an expanded portion of the Li-M-O Gibbs triangle of FIG. 10 showing the region of interest for the charge and discharge of Li/Li[Ni$_x$Li$_{(1-2x)/3}$Mn$_{(2-x)/3}$]O$_2$ cells.

FIG. 10 shows the Gibbs triangle of the ternary Li-M-O system where we have abbreviated $Ni_xMn_{(2-x)/3}$ by M, where x is set by the nickel quantity in $Li[Ni_xLi_{(1/3-2x/3)}Mn_{(2/3-x/3)}]O_2$. The compositions of relevant phases in the triangle are given. The solid solution series $Li[Ni_xLi_{(1/3-2x/3)}Mn_{(2/3-x/3)}]O_2$ (0<x<0.5) is found on the line joining $Li[Li_{1/3}M_{2/3}]O_2$ and $LiMO_2$. The line joining $Li[Li_{1/3}M_{2/3}]O_2$ and $MO_2$ represents a line of constant transition metal oxidation state equal to 4+. FIG. 11 shows an expanded view of the Gibbs triangle in the region of interest to describe the charge of a $Li/Li[Ni_xLi_{(1/3-2x/3)}Mn_{(2/3-x/3)}]O_2$ cell.

The path of the stoichiometry of the electrode particles is traced by the heavy solid line in FIG. 11 which is illustrated for the case x=1/6. The electrode in the freshly assembled cell begins at the point of intersection between the heavy solid line and the line joining $Li[Li_{1/3}M_{2/3}]O_2$ and $LiMO_2$. During the charge to 4.45 V, the electrode composition moves to the point "A". This corresponds to the stoichiometry $Li_{1-2x}[Ni_xLi_{(1-2x)/3}Mn_{(2-x)/3}]O_2$ for x=1/6 as given in table 1. Next, we assume that the overall stoichiometry of the electrode material continues to move on a straight line between "A" and "D", into a two-phase region between oxygen gas and a solid with transition metals in oxidation state 4+. Thus, the solid portion of the electrode moves from "A" to "B". At the point "B", we assume that the transition metals are in oxidation state 4+ and that all Li is removed from the Li layers, leading to the stoichiometry $[\ ][Ni_xLi_{(1-2x)/3}Mn_{(2-x)/3}]O_{1.5+x}$ at the point "B" as shown in FIG. 11 and table 1. Now, during the next discharge cycle, we assume that lithium is simply added to this oxygen deficient layered phase, until the Li layers are filled again, corresponding to the path from "B" to "C" in FIG. 11. The point "C" in FIG. 11 has the stoichiometry $Li[Ni_xLi_{(1-2x)/3}Mn_{(2-x)/3}]O_{1.5+x}$ (for x=1/6) as given in table 1. Subsequent cycling occurs between "B" and "C".

Figures 12A, 12B, 12C, 12D, 12E:
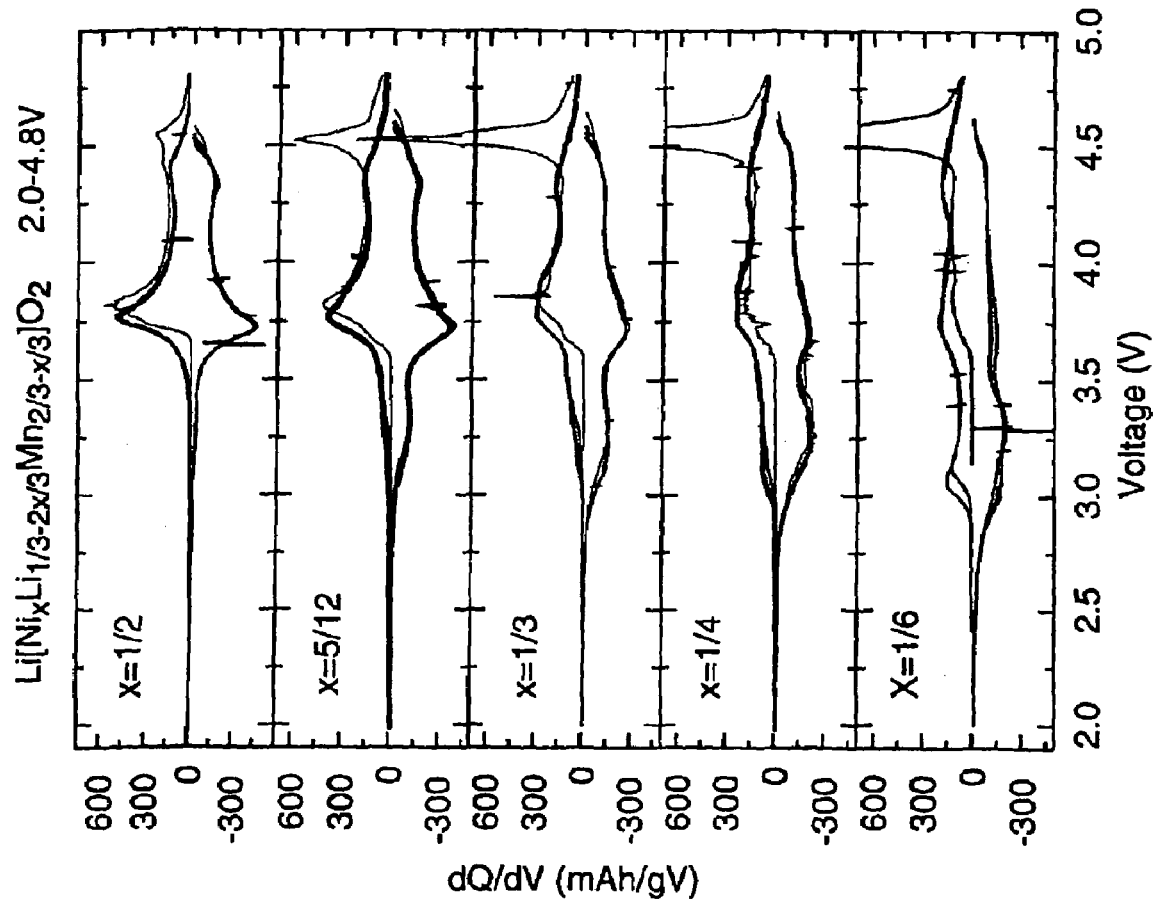
FIG. 12 is a plot of differential capacity versus voltage for Li/Li[Ni$_x$Li$_{(1/3-2x/3)}$Mn$_{(2/3-x/3)}$]O$_2$ cells with x as indicated. The cells were charged and discharged between 2.0 and 4.8 V using a specific current of 5 mA/g.

The scenario described by the heavy line in FIG. 11 predicts that the first charge should be different from subsequent cycles, as observed in FIG. 1. FIG. 12 reinforces this point by showing that the differential capacity versus voltage of the first charge to 4.8 V is different than the next cycles for the cells described by FIG. 1. The subsequent cycles are very reversible, as predicted by the line from "B" to "C" in FIG. 11.

If the oxygen content of the solid portion of the electrode is reduced along the line from "A" to "B", then there will be a point during the subsequent discharge where the reduction of Mn must occur. If we assume that $Ni^{4+}$ is first completely reduced to $Ni^{2+}$ and then $Mn^{4+}$ is reduced, we can predict the point where Mn reduction should occur. The stoichiometry where Mn reduction first occurs based on this assumption is $Li_{2x}[Ni_xLi_{(1-2x)/3}Mn_{(2-x)/3}]O_{1.5+x}$ as given in table 1.

TABLE 1

Stoichiometry of Li[Ni$_x$Li$_{(1-2x)/3}$Mn$_{(2-x)/3}$]O$_2$ starting material assuming all
Ni and Mn are in the +4 oxidation state (2nd column); the stoichiometry reached when all
Ni has been oxidized to Ni$^{4+}$ near 4.45 V (3rd column); the stoichiometry reached when all
Li is removed from the Li layer (4.8 V), assuming Ni and Mn cannot be oxidized beyond
4+ and oxygen loss can occur (4th column); the stoichiometry reached when all Ni has
been reduced to Ni$^{2+}$ during discharge and Mn begins to be reduced (near 3.5 V) (2nd
column of lower table); the stoichiometry reached at 2.5 V, assuming all sites in the Li
layer can be re-filled (3rd column of lower table); the Mn oxidation state reached at 2.5 V,
assuming all Ni is Ni$^{2+}$ (4th column of lower table); and the unit cell volume measured
from in-situ XRD experiments at various states of charge for two of the samples.

| X | Initial Stoichiometry | Stoichiometry at 4.45 V | Stoichiometry at 4.8 V |
|---|---|---|---|
| X | Li[Ni$_x$Li$_{(1-2x)/3}$Mn$_{(2-x)/3}$]O$_2$ | Li$_{1-2x}$[Ni$_x$Li$_{(1-2x)/3}$Mn$_{(2-x)/3}$]O$_2$ | [Ni$_x$Li$_{(1-2x)/3}$Mn$_{(2-x)/3}$]O$_{1.5+x}$ |
| 0.167 | Li[Ni$_{0.167}$Li$_{0.222}$Mn$_{0.611}$]O$_2$ | Li$_{0.667}$[Ni$_{0.167}$Li$_{0.222}$Mn$_{0.611}$]O$_2$ | [Ni$_{0.167}$Li$_{0.222}$Mn$_{0.611}$]O$_{1.667}$ |
| 0.25 | Li[Ni$_{0.25}$Li$_{0.167}$Mn$_{0.583}$]O$_2$ | Li$_{0.5}$[Ni$_{0.25}$Li$_{0.167}$Mn$_{0.583}$]O$_2$ | [Ni$_{0.25}$Li$_{0.167}$Mn$_{0.583}$]O$_{1.75}$ |
| 0.333 | Li[Ni$_{0.33}$Li$_{0.113}$Mn$_{0.556}$]O$_2$ | Li$_{0.33}$[Ni$_{0.33}$Li$_{0.113}$Mn$_{0.556}$]O$_2$ | [Ni$_{0.33}$Li$_{0.113}$Mn$_{0.556}$]O$_{1.833}$ |
| 0.416 | Li[Ni$_{0.416}$Li$_{0.056}$Mn$_{-/528}$]O$_2$ | Li$_{0.168}$[Ni$_{0.416}$Li$_{0.056}$Mn$_{-/528}$]O$_2$ | [Ni$_{0.416}$Li$_{0.056}$Mn$_{-/528}$]O$_{1.916}$ |
| 0.5 | Li[Ni$_{0.5}$Mn$_{0.5}$]O$_2$ | | [Ni$_{0.5}$Mn$_{0.5}$]O$_2$ |

| X | Stoichiometry when Mn begins to be reduced during discharge | Stoichiometry at 2.5 V | Mn oxidation state at 2.5 V | Initial unit cell volume (Å$^3$) | Unit cell volume (Å$^3$) at 4.8 V | Unit cell volume (Å$^3$) at 2.5 V |
|---|---|---|---|---|---|---|
| X | Li$_{2x}$[Ni$_x$Li$_{(1-2x)/3}$Mn$_{(2-x)/3}$]O$_{1.5+x}$ | Li[Ni$_x$Li$_{(1-2x)/3}$Mn$_{(2-x)/3}$]O$_{1.5+x}$ | (5 + 2x)/(2 − x) | | | |
| 0.167 | Li$_{0.33}$[Ni$_{0.167}$Li$_{0.222}$Mn$_{0.611}$]O$_{1.667}$ | Li[Ni$_{0.167}$Li$_{0.222}$Mn$_{0.611}$]O$_{1.667}$ | 2.91 | 100.7 | 98.2 | 103.0 |
| 0.25 | Li$_{0.5}$[Ni$_{0.25}$Li$_{0.167}$Mn$_{0.583}$]O$_{1.75}$ | Li[Ni$_{0.25}$Li$_{0.167}$Mn$_{0.583}$]O$_{1.75}$ | 3.14 | | | |
| 0.333 | Li$_{0.66}$[Ni$_{0.33}$Li$_{0.113}$Mn$_{0.556}$]O$_{1.833}$ | Li[Ni$_{0.33}$Li$_{0.113}$Mn$_{0.556}$]O$_{1.833}$ | 3.40 | | | |
| 0.416 | Li$_{0.83}$[Ni$_{0.416}$Li$_{0.056}$Mn$_{-/528}$]O$_{1.916}$ | Li[Ni$_{0.416}$Li$_{0.056}$Mn$_{-/528}$]O$_{1.196}$ | 3.68 | 102.5 | 98.8 | 103.0 |
| 0.5 | Li[Ni$_{0.5}$Mn$_{0.5}$]O$_2$ | Li[Ni$_{0.5}$Mn$_{0.5}$]O$_2$ | 4.0 | | | |

Figure 13:
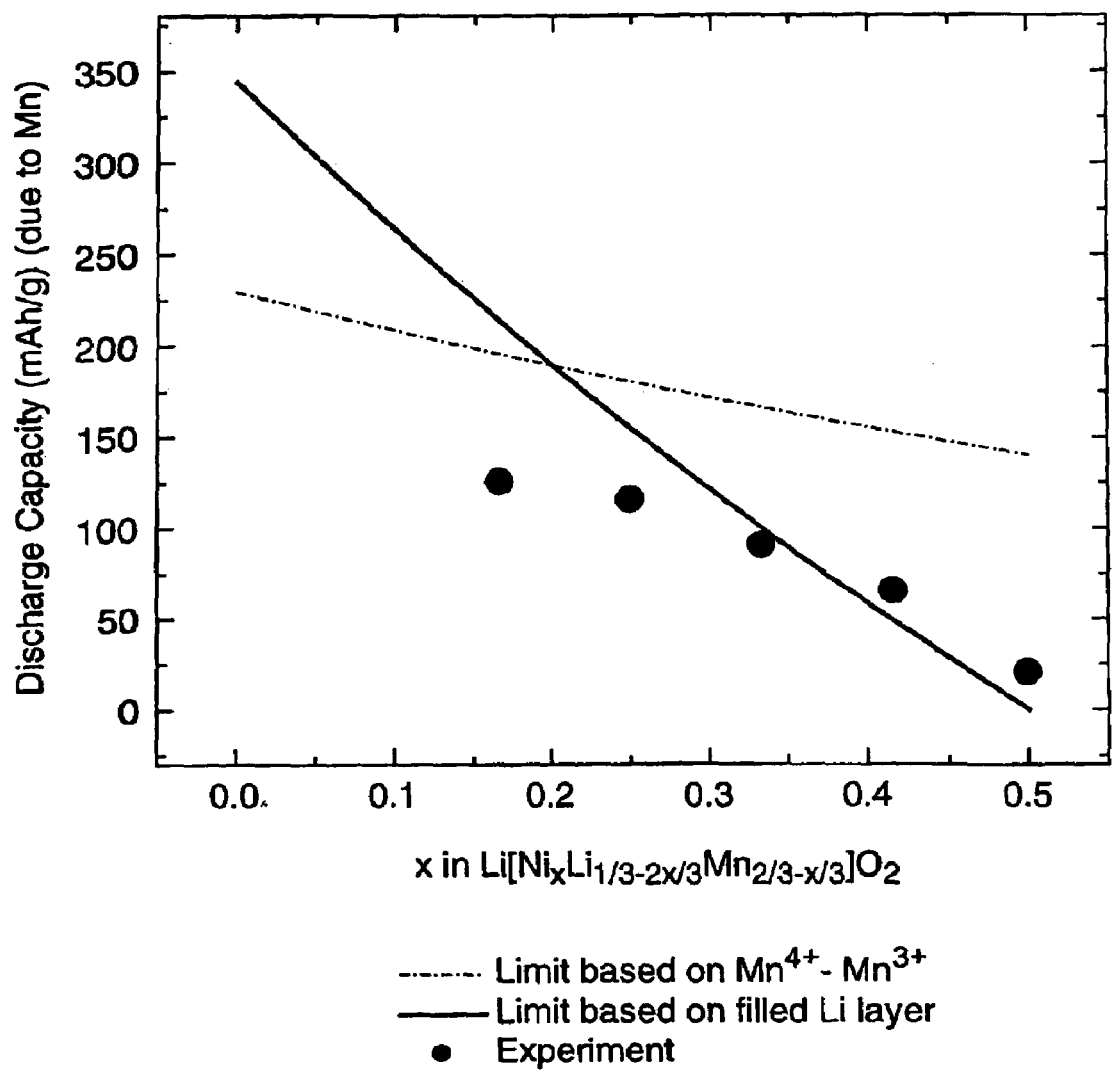
FIG. 13 is a plot of the portion of the discharge capacity of Li/Li[Ni$_x$Li$_{(1-2x)/3}$Mn$_{(2-x)/3}$]O$_2$ cells (first charged to 4.8 V) due to the reduction of Mn. The points are the experimental results, the solid line is the prediction if the capacity is governed by the sites available in the Li layer (after the Ni$^{4+}$ is reduced to Ni$^{2+}$) and the dashed line is the capacity available if all Mn$^{4+}$ in the compound is reduced to Mn$^{3+}$.
Figures 15A, 15B, 15C, 15D, 15E, 15F, 15G:
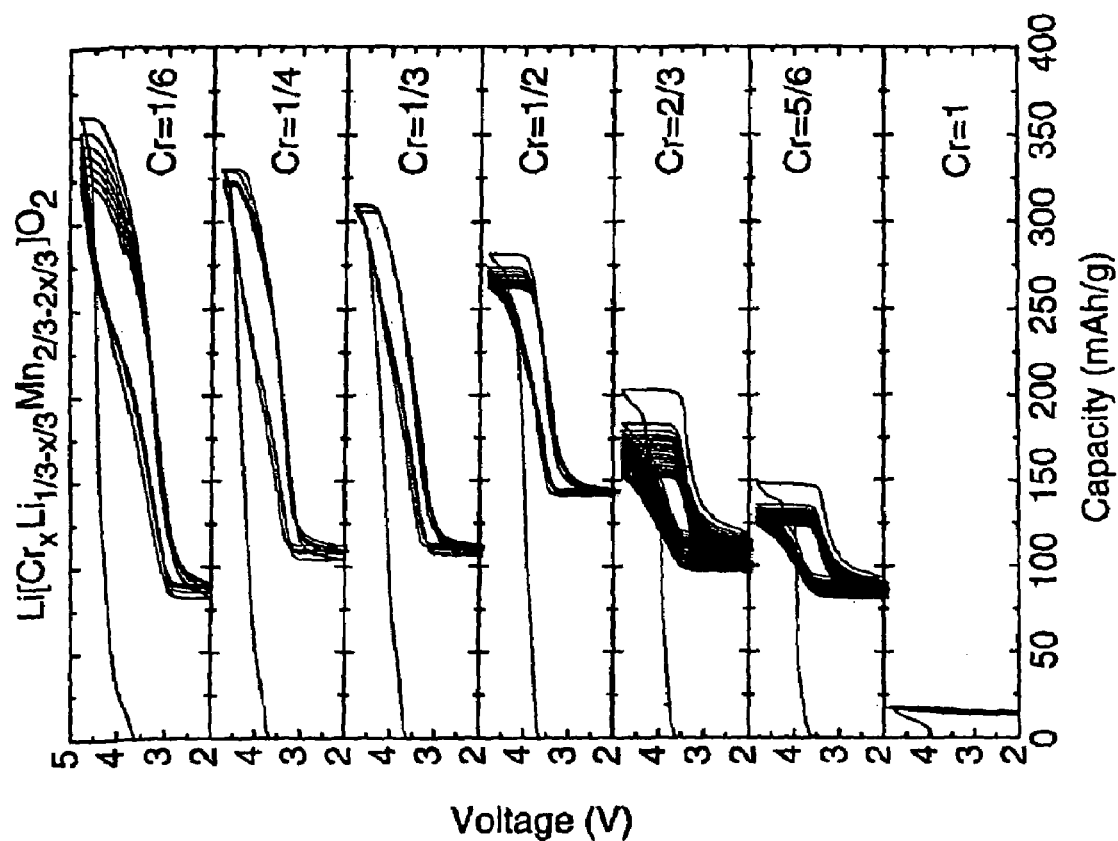
FIGS. 15a-15g are plots of specific capacity (mAh/g) vs. voltage (V) for electrochemical cells containing cathodes with cathode compositions of the formula Li[CR$_x$Li$_{1/3-x/3}$Mn$_{2/3-2x/3}$]O$_2$. Seven figures (FIGS. 15a-15g) are shown with x=1/6, 1/4, 1/3, 1/2, 2/3, 5/6 and 1 respectively.
Figures 16A, 16B, 16C, 16D, 16E, 16F, 16G:
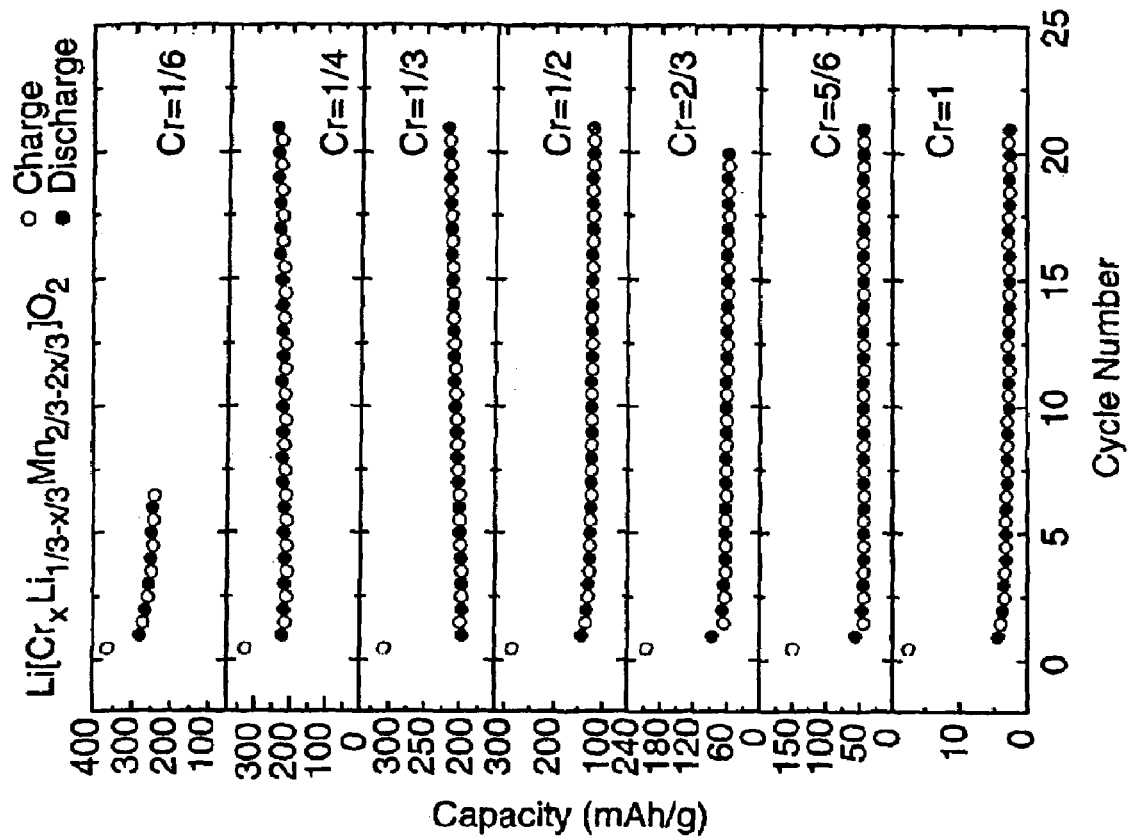
FIGS. 16a-16g are plots of cycle number vs. specific capacity (mAh/g) for for the same compositions in FIGS. 15a-15g.
Figures 17A, 17B, 17C, 17D, 17E, 17F, 17G:
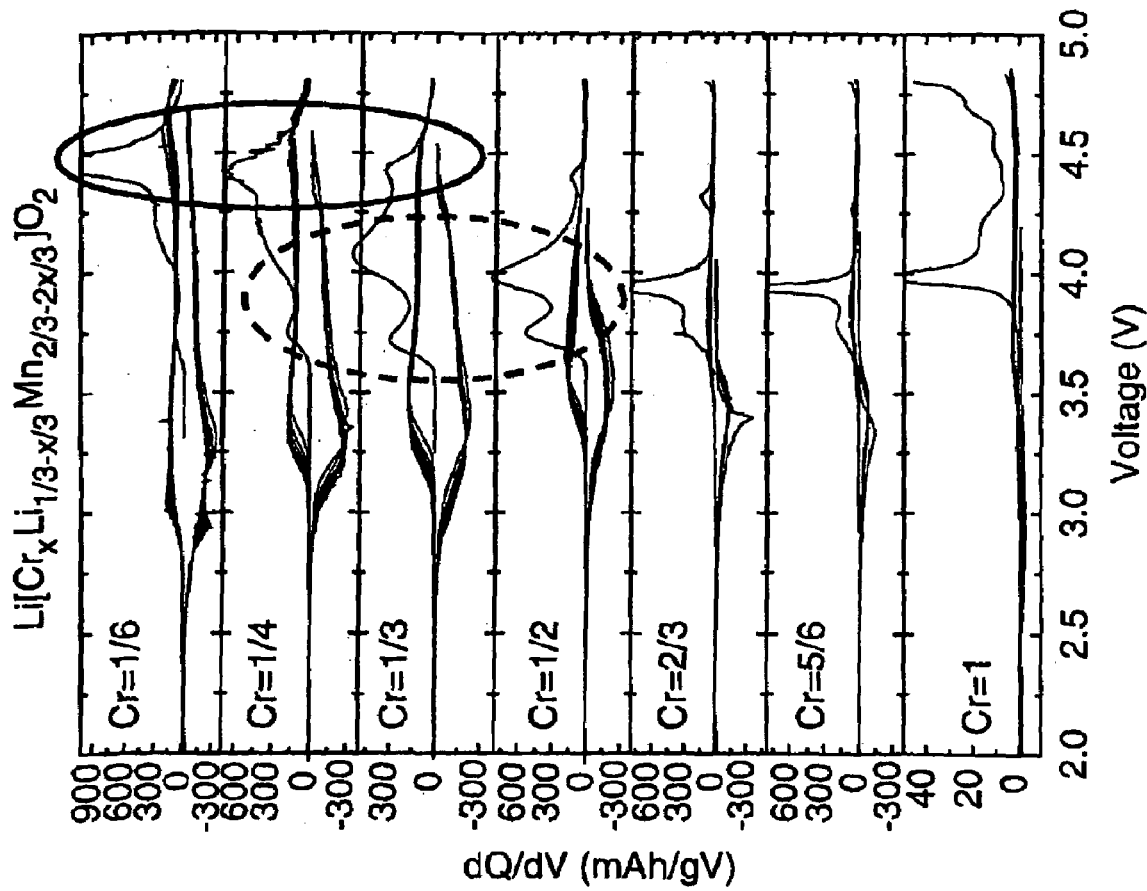
FIGS. 17a-17g are plots of voltage (V) vs. differential capacity dQ/dV (mAh/gV) for the same compositions in FIGS. 15a-15g.

A critical comparison of the differential capacities in FIGS. 6 (only Ni being oxidized and reduced) and 12 (both Ni and Mn being oxidized and reduced) suggests that the capacity below about 3.5 V during discharge must be due to the reduction of Mn. The capacity attributable to Mn reduction based on this model is 1–2x per formula unit. This prediction is shown as the solid line in FIG. 13 and is compared to the experimental discharge capacity below 3.5 V. The agreement is very good for the samples with x≧⅓. We take this qualitative agreement as conclusive evidence for the extraction of oxygen from the sample along the plateau for otherwise Mn reduction would not be required. A further consideration is that it may not be possible to reduce Mn beyond Mn$^{3+}$ at these potentials, even if the Li layer is not filled. The dashed line in FIG. 13 shows the capacity available based on the reduction of all the Mn$^{4+}$ to Mn$^{3+}$. Notice that the solid and dashed lines cross near x=0.2 which is close to the point where the experimental points appear to deviate from the solid line. The samples with x<⅓ do not agree well with either prediction. However these show substantial irreversible capacity which may be related to the large amounts of oxygen removed along the plateau. When so much oxygen is removed, it may be that substantial motion of the transition metals to the lithium layer may occur, leading to poor lithium diffusion and large irreversible capacity.

Figures 7A, 7B, 7C:
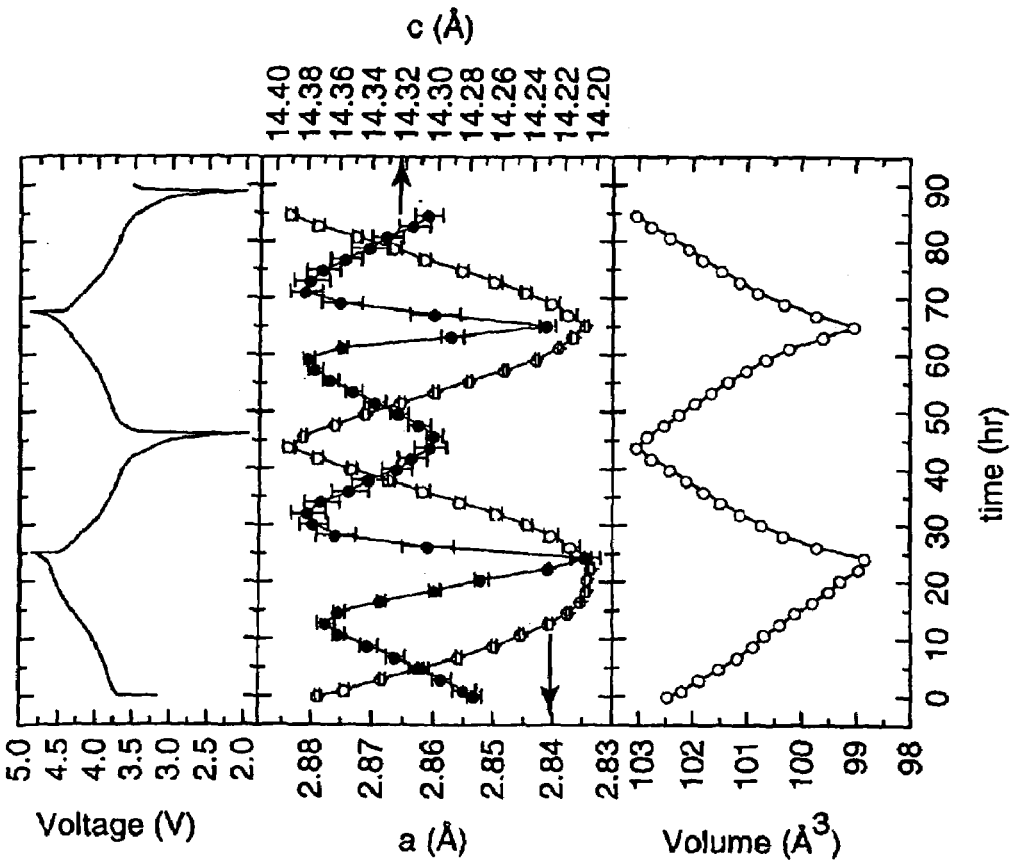
FIG. 7 are in-situ x-ray diffraction results for Li[Ni$_x$Li$_{(1/3-2x/3)}$Mn$_{(2/3-x/3)}$]O$_2$ with x=5/12. a) the voltage-time curve; b) the lattice constants a and c; and c) the unit cell volume correlated to the voltage-time curve. The cell was cycled between 2.0 and 4.8 V.

A comparison of the c-axis variation with lithium content in FIGS. 7b (for x=5/12) and 9b (for x=⅙) is instructive. When x=5/12, the c-axis first increases as as lithium is extracted from the host and only when most of the lithium is extracted does the c-axis fall rapidly. This is consistent with the behaviour observed for layered compounds like LiCoO$_2$. By contrast, the sample with x=⅙, (FIG. 9c) shows a relatively smooth variation of the c-axis with lithium content after crossing the anomalous plateau. This may suggest a transfer of some transition metals into the lithium layer. These heavy cations in the Li layer could be the cause of the large irreversible capacity observed for this sample since they would make it difficult to insert lithium into every available site due to slow diffusion.

Table 1 gives the expected Mn oxidation state at the point "C" in FIG. 11. Samples with smaller x in Li[Ni$_x$Li$_{(1/3-2x/3)}$Mn$_{(2/3-x/3)}$]O$_2$ have smaller Mn oxidation states at point "C" than do those with larger x. Since Mn$^{2+}$ and Mn$^{3+}$ are larger than Mn$^{4+}$, we expect samples at the point "C" in FIG. 11, to have larger unit cell volume than the original Li[Ni$_x$Li$_{(1/3-2x/3)}$Mn$_{(2/3-x/3)}$]O$_2$ starting materials. This is shown to be the case for both the x=⅙ and x=5/12 materials in table 1. The increase in unit cell volume is largest for the sample with x=⅙ because it has more reduced Mn than the sample with x=5/12.

The results above strongly suggest that oxygen loss from the samples occurs during the plateau at 4.5 V. In order to confirm this, ex-situ x-ray diffraction studies of electrodes with x=⅙, ⅓ and 5/12 charged to 4.8 V were made. FIG. 14 shows the diffraction pattern of the sample with x=⅓ and the best-fit to experiment calculated as described below. The structural model used to calculate the diffraction pattern in figure assumed that the sample retained the O3 structure. We assumed that the lithium layers were empty of lithium, but that an amount of Ni, equal to that found on the Li layers in the original Rietveld refinement of the Li[Ni$_x$Li$_{(1/3-2x/3)}$Mn$_{(2/3-x/3)}$]O$_2$ starting material, remained. The occupation of the Li, Ni and Mn atoms in the transition metal layer were fixed at the occupations originally found in the starting material. The occupation of the oxygen sites was allowed to vary and the best fit was found for an oxygen occupation of 1.813, which agrees well with that expected as indicated in table 1. This assumes random loss of oxygen from the oxygen sites, creating vacancies. The inset in FIG. 14 shows the variation of the goodness of fit and the Bragg R-factor with the occupation of the oxygen sites. This clearly indicates that oxygen loss from the compound has occurred.

Table 2 gives the results of the Rietveld refinement of the charged electrodes. The obtained oxygen stoichiometry is compared to the predicted oxygen stoichiometry at 4.8 V given in table 1 based on oxidation state arguments. It is our opinion that the agreement between predicted and measured oxygen stoichiometries is very good, and we take this as proof that the charged materials are oxygen deficient, in agreement with our model of events that occur during the charge plateau.

TABLE 2

Results of ex-situ x-ray diffraction analysis of the samples charged to 4.8 V, showing oxygen loss.

| x | Refined Parameters |
|---|---|
| x = 1/6 | a = 2.8437 ± 0.0006 Å |
| | c = 14.01306 ± 0.0089 Å |
| | n(O) = 1.73 ± 0.03 |
| | expected n(O), based on table 1 = 1.667 |
| | z(O) = 0.2397 ± 0.0005 |
| | $R_{wp}$ = 14.54%, $R_B$ = 5.4% |
| x = 1/3 | a = 2.8493 ± 0.0004 Å |
| | c = 14.2288 ± 0.0041 Å |
| | n(O) = 1.813 ± 0.016 |
| | expected n(O), based on table 1 = 1.833 |
| | z(O) = 0.2381 ± 0.0003 |
| | $R_{wp}$ = 9.13%, $R_B$ = 2.7% |
| x = 5/12 | a = 2.8478 ± 0.0003 Å |
| | c = 14.1958 ± 0.0030 Å |
| | n(O) = 1.875 ± 0.011 |
| | expected n(O), based on table 1 = 1.916 |
| | z(O) = 0.2347 ± 0.0002 |
| | $R_{wp}$ = 7.8%, $R_B$ = 3.8% |

The experimental evidence is consistent with the simultaneous extraction of both Li and O atoms along the plateau above 4.5 V during the first charge. The extraction is done in a way to keep the transition metal oxidation state fixed at 4, therefore it is as if $Li_2O$ is being removed from the compound during this plateau.

The experiments described here suggest new strategies to prepare high capacity electrode materials. Conventional wisdom would suggest the compound $Li[Ni_xLi_{(1/3-2x/3)}Mn_{(2/3-x/3)}]O_2$ with x=¼ would be limited to about 140 mAh/g based on the limit set by the oxidation of Ni and Mn to the 4+ state. It is clear, however, that if oxygen extraction can occur during the first charge, then much larger capacities can be attained. For $Li[Ni_xLi_{(1/3-2x/3)}Mn_{(2/3-x/3)}]O_2$ with x=¼ we have shown reversible cycling capacities near 230 mAh/g.

The invention will now be described further by way of the following examples.

EXAMPLES

Examples 1-7

$LiOH.H_2O$ (98%+, Aldrich), $Ni(NO_3)_2.6H_2O$ (98%+, Fluka) and $Mn(NO_3)_2.6H_2$ (97%+, Fluka) were used as the starting materials. The samples $Li[Ni_xLi_{(1/3-2x/3)}Mn_{(2/3-x/3)}]O_2$ (0=0.0, 1/12, 1/6, 1/4, 1/3, 5/12, and 1/2) were prepared by the "mixed hydroxide" method as described in Z. Lu and J. R. Dahn, J. Electrochem. Soc. 148, A237 (2001) and incorporated herein by reference.

A 50 ml aqueous solution of the transition metal nitrates was slowly dripped (1 to 2 hours) into 400 ml of a stirred solution of LiOH using a buret. This causes the precipitation of $M(OH)_2$ (M=Mn, Ni) with what we hope is a homogeneous cation distribution. The buret was washed three times to make sure that all the transition metal nitrates were added to the LiOH solution. The precipitate was filtered out and washed twice with additional distilled water to remove the residual Li salts (LiOH and the formed $LiNO_3$). The precipitate was dried in air at 180° C. overnight. The dried precipitate was mixed with the stoichiometric amount of $Li(OH).H_2O$ and ground in an automatic grinder. Pellets about 5 mm thick were then pressed. The pellets were heated in air at 480° C. for 3 hrs. Tongs were used to remove the pellets from the oven and sandwich them between two copper plates in order to quench the pellets to room temperature. The pellets were ground and new pellets made. The new pellets were heated in air at 900° C. for another 3 hrs and quenched to room temperature in the same way. The samples described here are the same ones reported in U.S. Ser. No. 09/845,178.

X-Ray Diffraction

X-ray diffraction was made using a Siemens D500 diffractometer equipped with a Cu target X-ray tube and a diffracted beam monochromator. Profile refinement of the data for the powder samples was made using Hill and Howard's version of the Rietveld Program Rietica as described in Rietica v1.62, window version of LHPM, R. J. Hill and C. J. Howard, J. Appl. Crystallogr. 18, 173 (1985); D. B. Wiles and R. A. Young, J. Appl. Crystallogr. 14, 149 (1981).

The materials are single phase and adopt the $\alpha$-$NaFeO_2$ structure (space group R-3M, #166). In-situ x-ray diffraction measurements were made using the same diffractometer and lattice constants were determined by least squares refinements to the positions of at least 7 Bragg peaks. Rietveld profile refinement was not performed on in-situ x-ray diffraction results.

Electrode Preparation and Testing

"Bellcore-type" electrodes were prepared for the electrochemical tests. Z grams of the sample is mixed with ca. 0.1Z (by weight) super S carbon black and 0.25Z Kynar 2801 (PVdF-HFP)(Elf-Atochem). This mixture was added to 3.1Z acetone and 0.4Z dibutyl phthalate (DBP, Aldrich) to dissolve the polymer.

After several hours of stirring and shaking, the slurry was then spread on a glass plate using a notch bar spreader to obtain an even thickness of 0.66 mm. When the acetone evaporated, the dry films were peeled off the plate and punched into circular disks with a diameter of 12 mm. The punched electrode was washed several times in anhydrous diethyl ether to remove the DBP. The washed electrode was dried at 90° C. in air overnight before use. Using the above positive electrodes, 2325 type coin-cells (23 mm diameter, 2.5 mm thick) were assembled in an argon glove-box (water<5 ppm, $O_2$<5 ppm) with lithium as the anode, Celgard 2502 membrane as the separator and 1M $LiPF_6$ in 33 vol % ethylene carbonate (EC)+67 vol % diethyl carbonate (DEC) (Mitsubishi Chemical) as the electrolyte. Usually, the cathode mass was around 20 mg. The cells were tested using constant charge and discharge currents between the desired potential limits.

In-situ x-ray diffraction measurements were made in the same coin-type cells, except the can of the cell had a circular hole that was replaced by a beryllium window as described in M. N. Richard, I. Koetschau and J. R. Dahn, J. Electrochem. Soc., 144, 554 (1997). The cathode electrode was facing the beryllium, so that diffraction patterns with minimal contamination from cell hardware could be obtained. Cells were charged and discharged using constant currents and x-ray diffraction scans were collected sequentially.

In order to examine the crystal structure of $Li[Ni_x Li_{(1/3-2x/3)}Mn_{(2/3-x/3)}]O_2$ after the long charge plateau at 4.5 V, electrochemical cells were prepared for ex-situ diffraction studies. Cells using electrodes of materials with $x=1/6$, $1/3$ and $5/12$ were charged to 4.8 V and stabilized there. After the cell current decayed to below 5 mA/g the cells were disassembled and the positive electrode recovered. The electrode was washed with EC-DEC (33%:67%) solvent to remove the dissolved salt. The electrode powder was placed on a zero background holder (510-cut Si) and a diffraction pattern was recorded. Rietveld refinement was then used to obtain the structural parameters of the sample.

What is claimed is:

1. A cathode composition for a lithium ion battery having the formula $Li_x[M^1_{(1-b)}Mn_b]O_{1.5+c}$ where $0<x<1$, $0<b<1$ and $0<c<0.5$ and $M^1$ represents one or more metal elements, said composition characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

2. A cathode composition for a lithium-ion battery having the formula $Li_y[Li_{(1-2x)/3}M^2_xMn_{(2-x)/3}]O_{1.5+x}$ where $0<y<1$, $0<x<0.5$ and $M^2$ represents one or more metal elements, with the proviso that the weighted average oxidation state of all $M^2$ is 2 when in a fully uncharged state and 4 when in a fully charged state.

3. The cathode composition of claim 2 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

4. A cathode composition for a lithium-ion battery having the formula $Li_{y+a}[Li_{(1-2x)/3}M^2_xMn_{(2-x)/3}]O_{1.5+x+y/2}$ where $0<a<(1-y)$, $0<y<(1-2x)$ and $0<x<0.5$ and $M^2$ represents one or more metal elements, with the proviso that the weighted average oxidation state of all $M^2$ is 2 when in a fully uncharged state and 4 when in a fully charged state.

5. The cathode composition of claim 4 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

6. A cathode composition for a lithium ion battery having the formula $Li_y[Li_{(1-2x)/3}M^2_xMn_{(2-x)/3}]O_{1.5+x+y/2}$ where $0<y<(1-2x)$ and $0<x<0.5$ and $M^2$ represents one or more metal elements, with the proviso that the weighted average oxidation state of all $M^2$ is 2 when in a fully uncharged state and 4 when in a fully charged state.

7. The cathode composition of claim 6 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

8. A cathode composition according to any one of claims 2-7 wherein $M^2$ is nickel.

9. A cathode composition for a lithium-ion battery having the formula $Li_y[Li_{(1-2x)/3}M^2_xMn_{(2-x)/3}]O_{1.5+x/2}$ where $0<y<1$ and $0<x<1$ and $M^2$ represents one or more metal elements, with the proviso that the weighted average oxidation state of all M is 3 when in a fully uncharged state and 4 when in a fully charged state.

10. The cathode composition of claim 9 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

11. A cathode composition for a lithium-ion battery having the formula $Li_{y+a}[Li_{(1-x)/3}M^2_xMn_{(2-2x)/3}]O_{1.5+x/2+y/2}$ where $0<a<(1-y)$, $0<y<(1-x)$ and $0<x<1$ and $M^2$ represents one or more metal elements, with the proviso that the weighted average oxidation state of all $M^2$ is 3 when in a fully uncharged state and 4 when in a fully charged state.

12. The cathode composition of claim 11 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

13. A cathode composition for a lithium-ion battery having the formula $Li_y[Li_{(1-x)/3}M^2_xMn_{(2-2x)/3}]O_{1.5+x/2+y2}$ where $0<y<(1-x)$ and $0<x<1$ and $M^2$ represents one or more metal elements, with the proviso that the weighted average oxidation state of all $M^2$ is 3 when in a fully uncharged state and 4 when in a fully charged state.

14. The cathode composition of claim 13 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

15. A cathode composition according to any one of claims 9-14 wherein $M^2$ is selected from the group consisting of Co and Fe and combinations thereof.

16. A cathode composition for a lithium-ion battery having the formula $Li_y[Li_{(1-x)/3}M^2_xMn_{(2-2x)/3}]O_{1.5+1.5x}$ where $0<y<1$ and $0<x<0.33$ and $M^2$ represents one or more metal elements, with the proviso that the weighted average oxidation state of all $M^2$ is 3 when in a fully uncharged state and 6 when in a fully charged state.

17. The cathode composition of claim 16 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

18. A cathode composition for a lithium-ion battery having the formula $Li_{y+a}[Li_{(1-x)/3}M^2_xMn_{(2-2x)/3}]O_{1.5+1.5x-y/2}$ where $0<a<(1-y)$, $0<y<(1-3x)$ and $0<x<0.33$ and $M^2$ represents one or more metal elements, with the proviso that the weighted average oxidation state of all $M^2$ is 3 when in a fully uncharged state and 6 when in a fully charged state.

19. The cathode composition of claim 18 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

20. A cathode composition for a lithium-ion battery having the formula $Li_y[Li_{(1-x)/3}M^2{}_xMn_{(2-2x)/3}]O_{1.5+1.5x+y/2}$ where $0<y<(1-3x)$ and $0<x<0.33$ and $M^2$ represents one or more metal elements, with the proviso that the weighted average oxidation state of all $M^2$ is 3 when in a fully uncharged state and 6 when in a fully charged state.

21. The cathode composition of claim 20 wherein said composition is characterized as being in the form of a single phase having an O3 crystal structure that does not undergo a phase transformation to a spinel crystal structure when incorporated in a lithium-ion battery and cycled for 100 full charge-discharge cycles at 30 C and a final capacity of 130 mAh/g using a discharge current of 30 mA/g.

22. A cathode composition according to any one of claims 16-21 wherein $M^2$ is chromium.

23. A lithium-ion battery comprising the cathode composition of any of claims 1, 2, 4, 6, 9, 11, 13, 16, 18, and 20.

* * * * *

UNITED STATES PATENT AND TRADEMARK OFFICE
CERTIFICATE OF CORRECTION

PATENT NO. : 7,368,071 B2
APPLICATION NO. : 11/317607
DATED : May 6, 2008
INVENTOR(S) : Jeffrey R. Dahn It is certified that error appears in the above-identified patent and that said Letters Patent is hereby corrected as shown below:

On the Title Page, Column 2, under (Other Publications)
Line 3, delete "Electrochemcial" and insert -- Electrochemical --, therefor.

On Page 3, Column 2, under (Other Publications)
Line 49, after "Lithium" delete "limited" and insert -- Limited --, therefor.
Line 67, after "Substitution" delete "of" and insert -- for --, therefor.

Column 2
Line 1, after "and" delete "and".
Line 43, after "metal" delete "metal".

Column 5
Line 15, after "Li/Li" delete "[Ni $_x$Li" and insert -- [Ni$_x$Li --, therefor.

Columns 9-10, Under Table 1, under (Under "Stoichiometry at 2.5 V")
Line 2, delete "Mn$_{(2-x)/3}$O" and insert -- Mn$_{(2-x)/3}$]O --, therefor.

Column 9
Line 63, after "as" delete "as".

Column 11
Line 64, delete "LiOH.H$_2$O" and insert -- LiOH·H$_2$O --, therefor.
Line 64, delete "Ni(NO$_3$)$_2$.6H$_2$O" and insert -- Ni(NO$_3$)$_2$·6H$_2$O --, therefor.
Line 65, delete "Mn(NO$_3$)$_2$.6H$_2$" and insert -- Mn(NO$_3$)$_2$·6H$_2$O --, therefor.

Column 12
Line 15, delete "Li(OH).H$_2$O" and insert -- Li(OH)·H$_2$O --, therefor.

UNITED STATES PATENT AND TRADEMARK OFFICE
CERTIFICATE OF CORRECTION

PATENT NO.        : 7,368,071 B2
APPLICATION NO.   : 11/317607
DATED             : May 6, 2008
INVENTOR(S)       : Jeffrey R. Dahn It is certified that error appears in the above-identified patent and that said Letters Patent is hereby corrected as shown below:

Column 14
Line 7, in Claim 9, After "$M^2_x$" delete "$Mn_{(2-x)/3}$" and insert -- $Mn_{(2-2x)/3}$ --, therefor.

Signed and Sealed this

Eighteenth Day of November, 2008

JON W. DUDAS
*Director of the United States Patent and Trademark Office*